United States Patent
Chen et al.

(10) Patent No.: US 8,254,511 B2
(45) Date of Patent: Aug. 28, 2012

(54) METHOD AND APPARATUS FOR EQUALIZATION IN CLUSTERED CHANNELS

(75) Inventors: Po-Ying Chen, Hsinchu (TW); Shin-Yuan Wang, Hsinchu (TW)

(73) Assignee: Sunplus mMobile Inc., Hsinchu Science Park (TW)

( * ) Notice: Subject to any disclaimer, the term of this patent is extended or adjusted under 35 U.S.C. 154(b) by 289 days.

(21) Appl. No.: 12/716,971

(22) Filed: Mar. 3, 2010

(65) Prior Publication Data

US 2010/0226423 A1 Sep. 9, 2010

(30) Foreign Application Priority Data

Mar. 6, 2009 (TW) ................................ 98107234 A

(51) Int. Cl.
*H04B 1/10* (2006.01)
(52) U.S. Cl. ....................................................... 375/350
(58) Field of Classification Search ................... 375/220, 375/229, 230, 232, 233, 298, 316, 324, 340, 375/347, 348, 350; 370/203, 208, 335, 342
See application file for complete search history.

(56) References Cited

U.S. PATENT DOCUMENTS

| | | | |
|---|---|---|---|
| 2003/0133424 A1* | 7/2003 | Liang et al. | 370/335 |
| 2005/0063500 A1* | 3/2005 | Li et al. | 375/350 |
| 2006/0109892 A1* | 5/2006 | Li et al. | 375/148 |
| 2008/0075209 A1* | 3/2008 | Li et al. | 375/347 |
| 2008/0075216 A1* | 3/2008 | Li et al. | 375/355 |

* cited by examiner

*Primary Examiner* — David C. Payne
*Assistant Examiner* — Syed Haider
(74) *Attorney, Agent, or Firm* — Muncy, Geissler, Olds & Lowe, PLLC

(57) ABSTRACT

This invention relates to an equalization apparatus and an equalization method. A plurality of equalizers is applied to the equalization apparatus to eliminate interferences of multiple clusters in a channel. The weights of the equalizers are calculated under minimum mean square error criterion by gains of delay paths of multiple clusters in the whole channel. Therefore, the interference of different clusters in the whole channel can be greatly eliminated.

16 Claims, 14 Drawing Sheets

METHOD AND APPARATUS FOR EQUALIZATION IN CLUSTERED CHANNELS

This application claims priority of No. 098107234 filed in Taiwan R.O.C. on Mar. 6, 2009 under 35 USC 119, the entire content of which is hereby incorporated by reference.

BACKGROUND OF THE INVENTION

1. Field of Invention

The present invention relates in general to an equalization technique, and more particularly to an equalization technique for a channel with multiple clusters.

2. Related Art

In a wireless communication environment, there is a multipath phenomenon due to diffractions and refractions of electromagnetic waves caused by obstacles. Therefore, when a channel thereof is observed via a time domain perspective, the channel may have a plurality of delay paths. Moreover, when the channel is observed via a frequency perspective, the channel may be regarded as a frequency-selective channel.

Taking a present code division multiple access (CDMA) system as an example, to solve the problem of interference from the frequency-selective channel, a receiver of the CDMA system generally applies an equalization technique for equalizing the frequency-selective channel. In other words, an equalizer is used for equalizing the frequency-selective channel to be a frequency-flat channel, so as to reduce the multipath interference in the received signals.

FIG. 1 is a system block diagram of a receiver of a conventional CDMA applying an equalizer. Referring to FIG. 1, a channel response of a received signals r[m] estimated by a channel estimation unit 110, namely, a delay time $\tau$ of each delay path within the channel and a channel gain $\hat{h}(\tau)$ corresponding to each delay time are estimated, and a plurality of weights $w_0, w_1, w_2, \ldots, w_{F-1}$ of an equalizer 130 are calculated according to the estimated channel gains $\hat{h}(\tau)$, and then the weights $w_0, w_1, w_2, \ldots, w_{F-1}$ are output to the equalizer 130. Next, the equalizer 130 sequentially delays the received signals r[m] for a chip duration $T_C$. Then, after respectively multiplying the original received signal r[m] and the delayed received signals r[m−1], r[m−2], r[m−F+1] with the weights $w_0, w_1, w_2, \ldots, w_{F-1}$, a sum of above multiple multiplications is then outputted by the equalizer 130. A correlator 150 despreads the equalized signal processed by the equalizer 130 according to a spreading code c[n] of a client, and then a decision unit 170 demodulates a digital signal $\hat{b}$.

A window length of the equalizer 130 is represented by F. For a present equalization technique, a plurality of documents (for example, note [1]) refers to that the window length F of the equalizer has to be greater than or equal to double of the channel length thereof, so that the equalizer may effectively eliminate the multipath interference to the received signals. Therefore, as to the hardware of the receiver, if the window length of channel estimation is L, the window length F of the equalizer is then designed to be 2 L.

However, in case of a relatively serious channel delay spread, the length of an actual transmission channel is greatly increased, as shown in FIG. 2. FIG. 2 is a diagram illustrating a channel power delay profile. Referring to FIG. 2, horizontal axis thereof represents delay times, and vertical axis represents the channel power on its corresponding delay time. According to FIG. 2, the delay paths within the channel is sparsely distributed on time domain, and the delay paths may be grouped into several clusters of cluster 1, cluster 2 . . . cluster P. A reason of such channel phenomenon may be that in a hilly terrain (HT), the electromagnetic waves emitted from the transmitter are received by the receiver after a long distance reflection, so that the delay paths of the different clusters are generated. Alternatively in the case of soft handover (SHO), the receiver may be just located within transmission ranges of multiple base stations, so that the receiver may simultaneously receive signals from the multiple base stations, and therefore the delay paths of the multiple clusters are generated.

Due to a limitation of the hardware, if the window length of the equalizer of the receiver maintains to be F=2 L, the window length of the equalizer may not be enough to cover all the delay paths, so that the equalizer cannot effectively equalize the transmission channel, and accordingly performance of the receiver is degraded.

A U.S patent publication No. 2006/0109892 A1 provides a receiver having two equalizers, as shown in FIG. 3. The two equalizers 335 and 340 of the receiver 300 equalize the received signals respectively based on delay paths 305A and 305B of two clusters. Next, the signals equalized by the two equalizers 335 and 340 are combined for outputting to a CMIS circuit 352. The CMIS circuit 352 regenerates the signal and feeds back the regenerated signal to adders 325 and 330 for multipath interference cancellation.

When the weights are calculated, calculation of a weight of the equalizer 335 only considers a channel response of the delay path 305A from the first cluster, and calculation of a weight of the equalizer 340 only considers a channel response of the delay path 305B from the second cluster. In other words, the weights of the equalizers 335 and 340 are not calculated under a minimum mean square error (MMSE) criterion. Actually, when a signal is transmitted within the channel, the signal received by the equalizer 335 is interfered by the delay path 305B of the second cluster; however, the equalizer 335 only takes into account the delay path 305A of the first cluster. Similarly, the signal received by the equalizer 340 is interfered by the delay path 305A of the first cluster; however, the equalizer 340 only takes into account the delay path 305B of the second cluster. Therefore, though the two equalizers 335 and 340 are applied in the aforementioned patent, interferences of the delay paths 305A and 305B cannot be simultaneously mitigated. Since the equalizers 334 and 340 cannot totally eliminate the interferences within the channel, the signal restored by the CMIS circuit still has the interference. However, the restored signal with the interference is still fed back to the adders 325 and 330, so that an error propagation phenomenon occurs. Moreover, when signal energy received by the receiver is relatively small, such feedback mechanism may lead to an excessive small signal-to-interference plus noise ratio (SINR) of the receiver, and accordingly the performance of the receiver is degraded.

A receiver with multiple equalizers is provided in US Publication No. 2003/0133424 A1 as shown in FIG. 4. FIG. 4 is a system block diagram illustrating a receiver published in US Publication No. 2003/0133424 A1. The receiver 400 includes a plurality of equalizers 408A—408C for receiving the received signals from a plurality of antennas and equalizing the received signal respectively. After that, the equalized signals equalized by the equalizers 408A~408C are operated by time-alignment and dispreading, the combiner 311 combines the dispreading signals to recover the original signal.

When the weights of the equalizer 408A~408C are calculated, the calculation of the weights utilizes a method of direct matrix inversion under a minimum mean square error (MMSE) criterion. Actually, due to the calculation of direct matrix inversion, the arithmetic complexity of the receiver 400 is greatly increased. Also, considering the implementation of hardware, the hardware complexity of the receiver 400 should be limited so that the window length of the equalizers 408A~408C must be limited. Therefore, the equalizers 408A~408C may not be able to eliminate the interference of the received signals while the received signals are transmitted by the longer length of the transmission channel.

Note [1]: M. Melvasalo, P. Jänis and V. Koivunen. "Low complexity space-time MMSE equalization in WCDMA systems," proc. of 2005 IEEE 16th International Symposium on Personal, Indoor and Mobile Radio Communications, Berlin, Germany, pp. 306-310, 2005.

SUMMARY OF THE INVENTION

It is therefore an objective of the present invention to provide an equalization apparatus and a method thereof, by which a receiver may sufficiently process the received signal, so as to greatly reduce multipath interference from different clusters and increased efficiency of an equalizer.

To achieve the above-identified or other objectives, the present invention provides an equalization apparatus which is used for receiving a received signal, wherein the received signal is transmitted from a transmitter through a transmission channel. The transmission channel includes a plurality of delay paths, and the delay paths are at least grouped into P clusters. The equalization apparatus includes a channel estimation unit, a weight calculation unit, a cluster delay unit, P equalizers and a combination unit. The channel estimation unit is used for estimating gains of the delay paths respectively corresponding to the P clusters. The weight calculation unit is used for performing a minimum mean square error (MMSE) algorithm to the gains of the delay paths respectively corresponding to the P clusters, so as to obtain a plurality of first weights to the plurality of $P^{th}$ weights. The cluster delay unit is used for generating a plurality of cluster delayed signals by correspondingly delaying the received signal for $K_1, K_2, K_3, \ldots K_P$ unit time, wherein the received signal is represented as r[m], and the cluster delayed signals are respectively represented as $r[m-K_1]$, $r[m-K_2]$, $r[m-K_3] \ldots, r[m-K_P]$, wherein "m" is represented as a time index. The first equalizer to the $P^{th}$ equalizer are correspondingly receives the cluster delay signals $r[m-K_1]$, $r[m-K_2]$, $r[m-K_3] \ldots r[m-K_P]$, equalizing the cluster delayed signals to correspondingly obtain a first equalized signal to a $P^{th}$ equalized signal according to the corresponding first weights to the corresponding $P^{th}$ weights. The combination unit is used for combining the first equalized signals to $P^{th}$ equalized signal, and outputting a equalized signal. "P" is a nature number, and "P" is equal to or larger than 3. "$K_1$", "$K_2$", "$K_3$" ... "$K_P$" and "m" are integers.

The present invention additionally provides an equalization method, the method includes the steps of: receiving a received signal, wherein the received signal is transmitted from a transmitter through a transmission channel, wherein the transmission channel has a plurality of delay paths and the delay paths are at least grouped into P clusters; estimating gains of the delay paths corresponding to the P clusters; performing an minimum mean square error (MMSE) algorithm to the gains of the delay paths corresponding to the P clusters to obtain a plurality of first weights to a plurality of $P^{th}$ weights; respectively delaying the received signal for $K_1$, $K_2, K_3 \ldots K_P$ unit time to obtain a plurality of cluster delay signals, wherein the received signal is represented as r[m], where "m" is represented as a time index, wherein the cluster delay signals are respectively represented as $r[m-K_1]$, $r[m-K_2]$, $r[m-K_3] \ldots r[m-K_P]$; equalizing the cluster delay signals $r[m-K_1]$, $r[m-K_2]$, $r[m-K_3] \ldots r[m-K_P]$ to obtain a first equalized signal to a $P^{th}$ equalized signal according to the corresponding first weights to the corresponding $P^{th}$ weights; and combining the first equalized signal to the $P^{th}$ equalized signal and outputting a equalized signal. "P" is a nature number and larger than 3. "$K_1$", "$K_2$", "$K_3$" ... "$K_P$" and "m" are integers.

In the equalization method according to the preferred embodiment of the present invention, the method further includes the steps of: searching the delay paths in the transmission channel and the delay time corresponding to the delay paths; and determining a number of the clusters of the delay paths according to the delay time of the delay paths and determining a window interval according to the interval of the clusters and the initial delay time of the clusters of the delay paths.

In the equalization method according to the preferred embodiment of the present invention, the delay time of the $i^{th}$ delay path in the transmission channel is represented as $D_i$. The steps for determining the windows interval comprise: the step (a) of setting the initial number of i to 1; the step (b) of calculating a difference between $D_i$ and $D_{i-1}$; the step (c) of determining the difference between $D_i$ and $D_{i-1}$ is larger than a threshold value, wherein when the hypothesis is true, the step (d) and the step (e) are performed, when the hypothesis is false, the step (d) is skipped and the step (e) is performed; the step (d) of adding 1 to a cluster number counter represented as CN, and setting the delay time of the $1^{st}$ delay path of a $CN^{th}$ cluster to $D_i$; the step (e) of determining whether all delay paths are searched, if the hypothesis is false, performing the step (f) and going back to the step (b), otherwise performing the step (g); the step (f) of adding 1 to i; and the step (g) of determining the window interval according to the delay time of the $1^{st}$ delay path of the cluster corresponding to each cluster number counter.

In the present invention, since a plurality of equalizers are respectively applied for equalizing the received signal in different delay paths of different clusters, and meanwhile the weights of the equalizers are calculated by channel gains of the whole cannel under the MMSE criterion, each equalizer can greatly eliminate the interference of different clusters in whole channel.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

Figure 1:
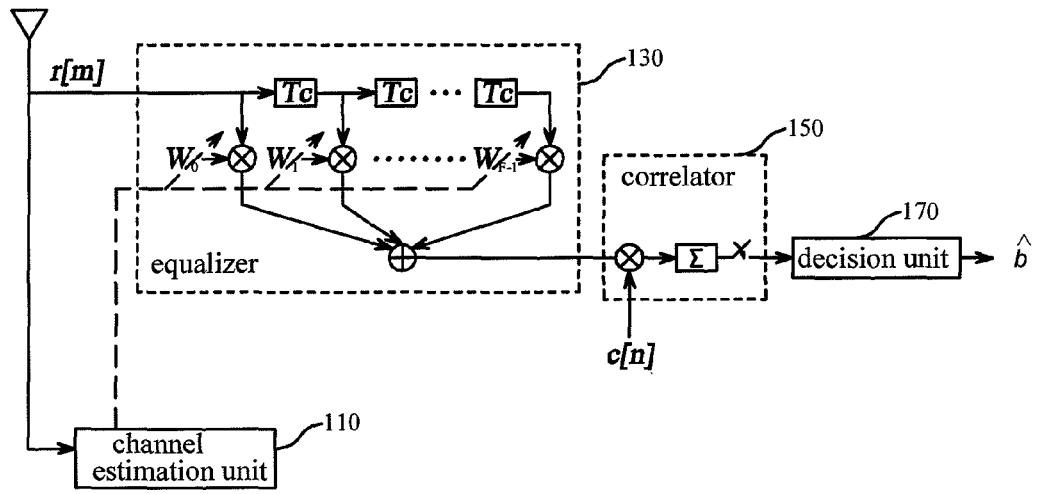
FIG. 1 is a system block diagram of a receiver of a conventional CDMA applying an equalizer.
Figure 2:
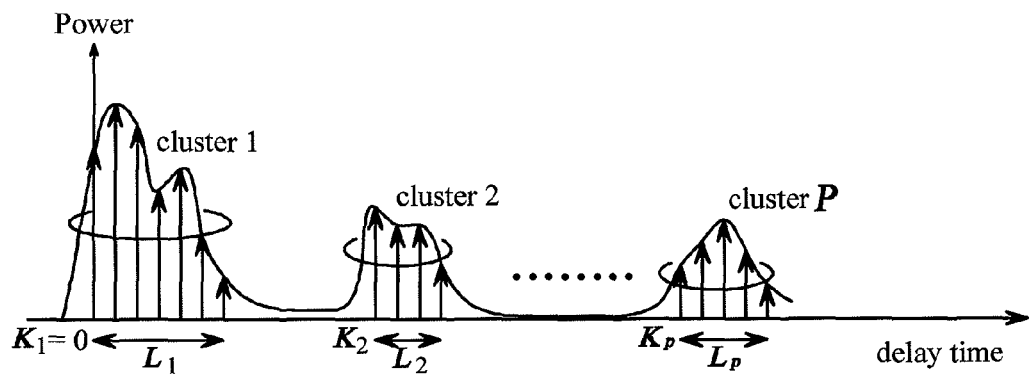
FIG. 2 is a diagram illustrating a channel power delay profile.
Figure 3:
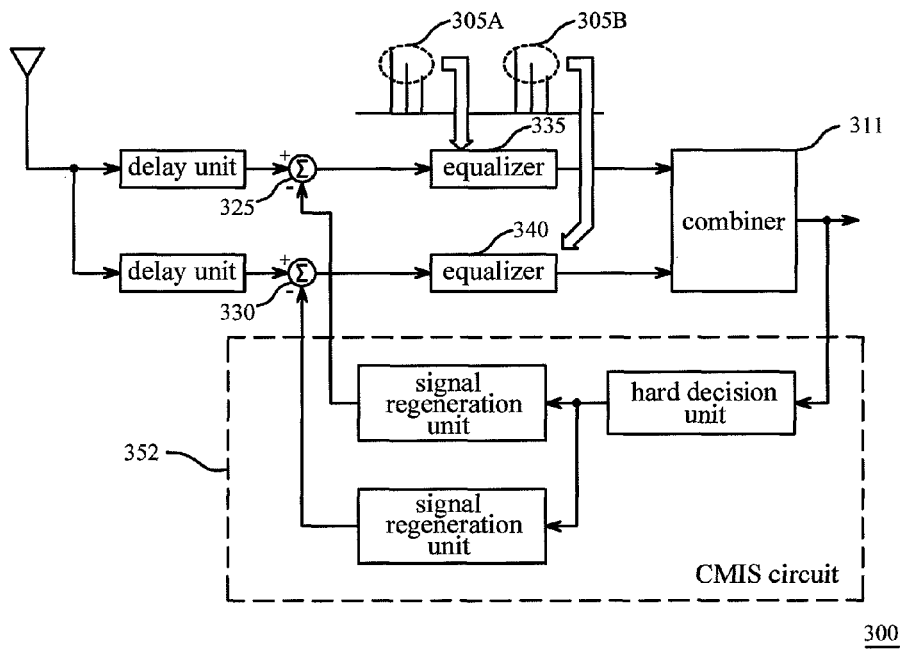
FIG. 3 is a system block diagram illustrating a receiver complying with the U.S patent laid-open publication No. 2006/0109892 A1.
Figure 4:
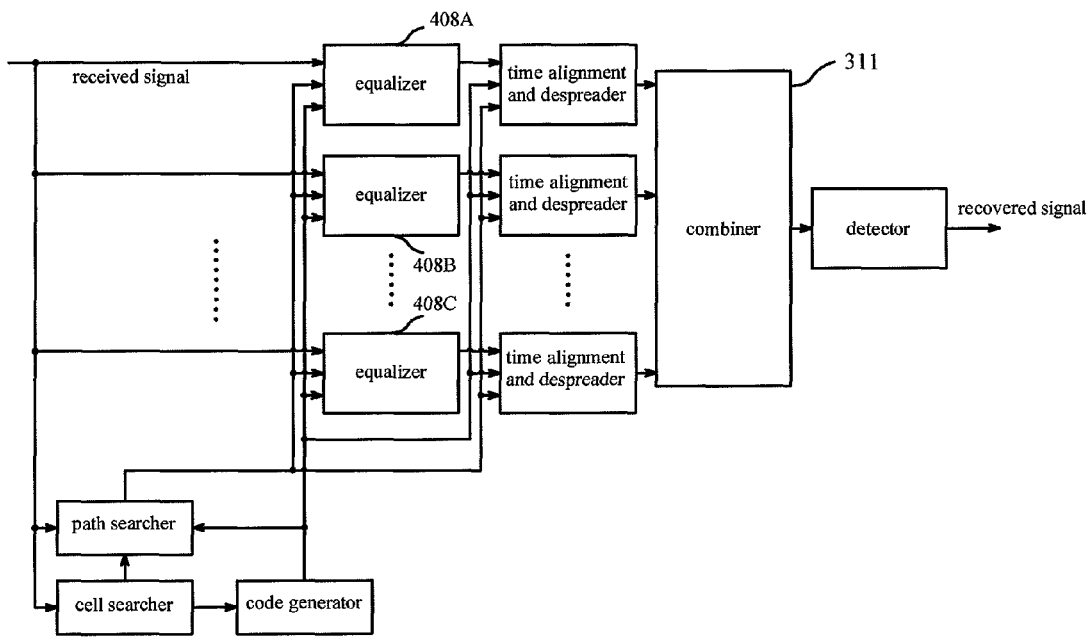
FIG. 4 is a system block diagram illustrating a receiver complying with the U.S patent laid-open publication No. 2003/0133424 A1.

In order to reduce an interference of a channel with excessive delay spread to a received signal, the present embodiment of the present invention provides an equalization apparatus and a method thereof. For conveniently describing the present embodiment, a transmission channel power delay profile is shown in FIG. 2. As shown in FIG. 2, the distribution of a plurality of delay paths in time domain may be grouped into a first cluster to a $P^{th}$ cluster, wherein the channel length of the first cluster is represented as $L_1$, the channel length of the second cluster is represented as $L_2, \ldots$, the channel length of the $P^{th}$ cluster is represented as $L_P$. The delay time of the first delay path within the first cluster is represented as $K_1$, the delay time of the first delay path within the second cluster is represented as $K_2, \ldots$, the delay time of the first delay path within the $P^{th}$ cluster is represented as $K_P$.

In the following content, the discrete time is used for representing the received signal and a channel response. Moreover, according to FIG. 2, the received signal of a $m^{th}$ unit time may be represented by:

$$r[m] = \sum_{p=1}^{P} \sum_{l=0}^{L_p-1} h[K_p + l]d[m - K_p - l] + v[m] \quad (1)$$

wherein h[•] represents a channel gain, d[•] represents a transmitted signal from the transmitter, v[•] represents a Gaussian noise, $L_p$ represents the number of delay paths within the $p^{th}$ cluster, $K_p$ represents the delay time of the first delay path within the $p^{th}$ cluster.

Figure 5:
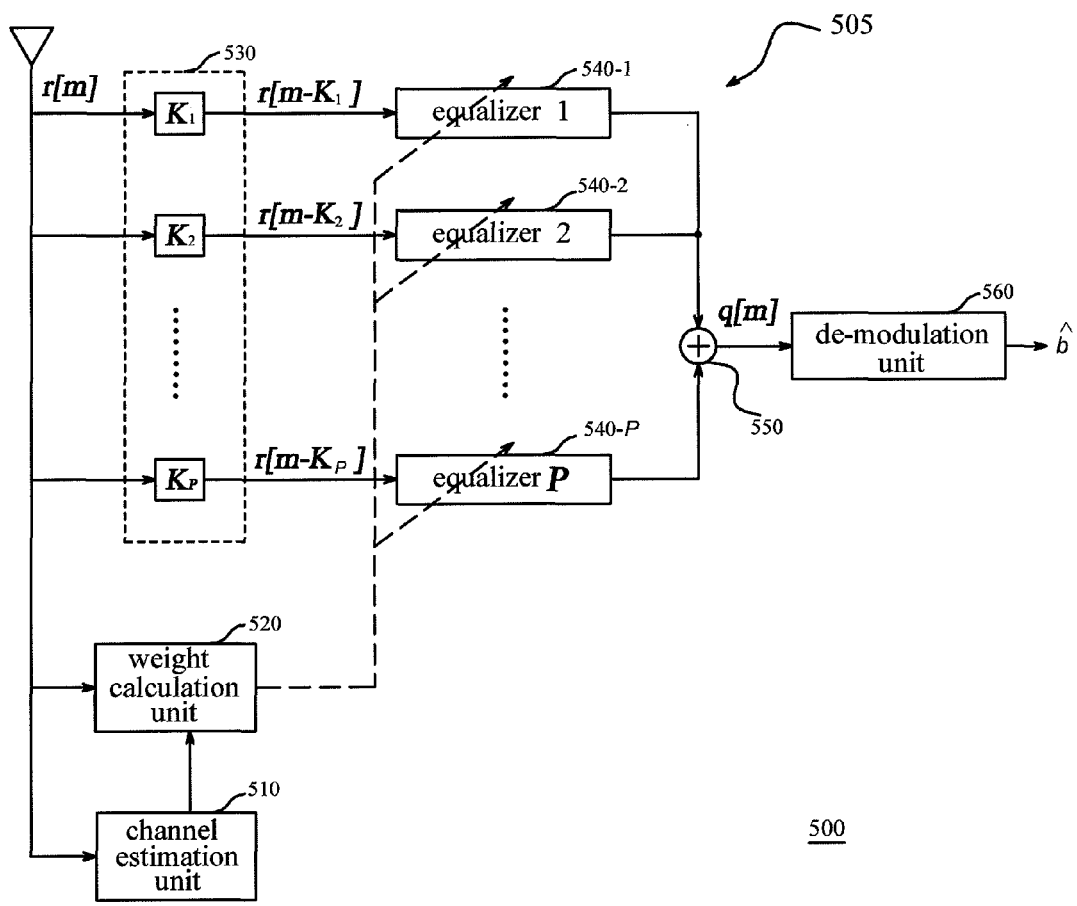
FIG. 5 is a system block diagram illustrating a receiver of an equalization apparatus according to an embodiment of the present invention.

For conveniently describing the present embodiment, it is assumed that the equalization apparatus provided by the present embodiment is applied to a receiver as shown in FIG. 5. FIG. 5 is a system block diagram illustrating a receiver of an equalization apparatus according to an embodiment of the present invention. Referring to FIG. 5, the receiver 500 includes an equalization apparatus 505 and a de-modulation unit 560. The equalization apparatus 505 receives a received signal r[m] from a transmitter through a transmission channel and equalizes the received signal r[m] to output a equalized signal q[m] to the de-modulation unit 560. The de-modulation unit 560 demodulates the equalized signal q[m] to obtain a digital signal $\hat{b}$.

The equalization apparatus 505 provided by the present embodiment includes a channel estimation unit 510, a weight calculation unit 520, a cluster delay unit 530, P equalizers 540_1~540_P and a combination unit 550. The channel estimation unit 510 receives the received signal r[m] and estimates gains of the delay paths respectively corresponding to the P clusters. The weight calculation unit 520 is used for performing a minimum mean square error (MMSE) algorithm to the gains of the delay paths respectively corresponding to the P clusters, so as to obtain a plurality of weights. And the weight calculation unit 520 correspondingly outputs the first weights to the $P^{th}$ weights to the equalizers 540_1~540_P. The cluster delay unit 530 is used for outputting a plurality of cluster delayed signals by correspondingly delaying the received signal for $K_1, K_2, K_3, \ldots K_P$ unit time, wherein the cluster delayed signals are respectively represented as $r[m-K_1], r[m-K_2], r[m-K_3] \ldots, r[m-K_P]$. The equalizers 540_1~540_P correspondingly receive the cluster delayed signals $r[m-K_1], r[m-K_2], r[m-K_3] \ldots, r[m-K_P]$ and equalize the cluster delayed signals to obtain a first to a $P^{th}$ equalized signals according to the first weights to the $P^{th}$ weights and then output the first to the $P^{th}$ equalized signals to the combination unit 550. The combination unit 550 combines the first to the $P^{th}$ equalized signals to output the equalized signal q[m].

The time parameters $K_1, K_2, K_3, \ldots, K_P$ of the cluster delay unit 530 can be determined according to the channel estimates obtained by the channel estimation unit 510. In other words, the channel estimation unit 510 estimates the delay time $K_1, K_2, K_3, \ldots, K_P$ of the first delay paths within the first cluster to $P^{th}$ cluster, and then the cluster delay unit 530 determines the time parameters $K_1, K_2, K_3, \ldots, K_P$ according to the estimated delay time. In addition, a present Multi-Path Searcher (MPS) can be implemented to search the delay time of each cluster, and the cluster delay unit 530 determines the time parameters $K_1, K_2, K_3, \ldots, K_P$ according to the searching result of the MPS.

In order to conveniently explain the present embodiment, the lengths of the equalizers 540_1~540_P are all assumed to be F for example, and the weight calculation unit 520 respectively outputs F weights to the equalizers 540_1~540_P. In addition, the $p^{th}$ weights are represented as $\underline{w}_p = [w_{p,0} \; w_{p,1} \cdots w_{p,F-1}]^T$, wherein "p" is a nature number between 1 to P. In other words, the outputted weights of the weight calculation unit 520 are represented as $\{\underline{w}_1, \underline{w}_2, \ldots, \underline{w}_P\}$, wherein each under-line in the abovementioned mathematic symbols represents a vector.

The equalization apparatus 505 provided by the present embodiment is used for eliminating the interference of the transmission channel to the received signal. Therefore, under the MMSE criterion, the mean square error between the transmitted signal and the equalized signal q[m] obtained based on the weights $\{\underline{w}_1, \underline{w}_2, \ldots, \underline{w}_P\}$ calculated by the weight calculation unit 520 has to be minimized. Namely, under the MMSE criterion, the weights $\{\underline{w}_1, \underline{w}_2, \ldots, \underline{w}_P\}$ should satisfy the following equation:

$$\{\underline{w}_1, \underline{w}_2, \ldots, \underline{w}_P\} = \underset{\{\underline{w}_1, \underline{w}_2, \ldots, \underline{w}_P\}}{\arg\min} E\left\{d[m-D] - \sum_{p=1}^{P} \underline{w}_p^H \underline{r}_{m-K_p}\right\} \qquad (2)$$

wherein E[•] in the equation (2) represents an expected value operation, arg min represents that a minimum value of the function is extracted. The superscript H represents a Hermitian operator, D represents a decision delay, $\underline{r}_{m-K_p}$ represents a vector composed by received signals delayed $K_p$ unit time, the value thereof is represented as $\underline{r}_{m-K_p} = (r[m-K_p] \; r[m-K_p-1] \; \ldots \; r[m-K_p-F+1])^T$. According to the abovementioned equation (2), the weights $\{\underline{w}_1, \underline{w}_2, \ldots, \underline{w}_P\}$ can be obtained by an adaptive approach or a direct matrix inversion.

The time parameters $K_1, K_2, K_3, \ldots, K_P$ of the cluster delay unit 530 can be determined according to the channel estimates obtained by the channel estimation unit 510. In other words, the channel estimation unit 510 estimates the delay time $K_1, K_2, K_3, \ldots, K_P$ of the first delay paths within the first cluster to $P^{th}$ cluster, and then the cluster delay unit 530 determines the time parameters $K_1, K_2, K_3, \ldots, K_P$ according to the estimated delay time. In addition, a present Multi-Path Searcher (MPS) can be implemented to search the delay time of each cluster in the present embodiment, and the cluster delay unit 530 determines the time parameters $K_1, K_2, K_3, \ldots, K_P$ according to the searching result of the MPS.

In the abovementioned embodiment, the equalization apparatus 505 utilizes the cluster delay unit 530 to delay the received signal with $K_1, K_2, K_3, \ldots, K_P$ unit time and then outputs to the equalizers 540_1~540_P. Therefore, the equalizers 540_1~540_P of the equalization apparatus 505 are used for eliminating the interference from the clusters in the channel. Meanwhile, the cluster delay unit 530 can be properly adjusted so that the equalization apparatus 505 can be used to equalize a multipath channel composed by a single cluster with longer channel length.

Figure 6:
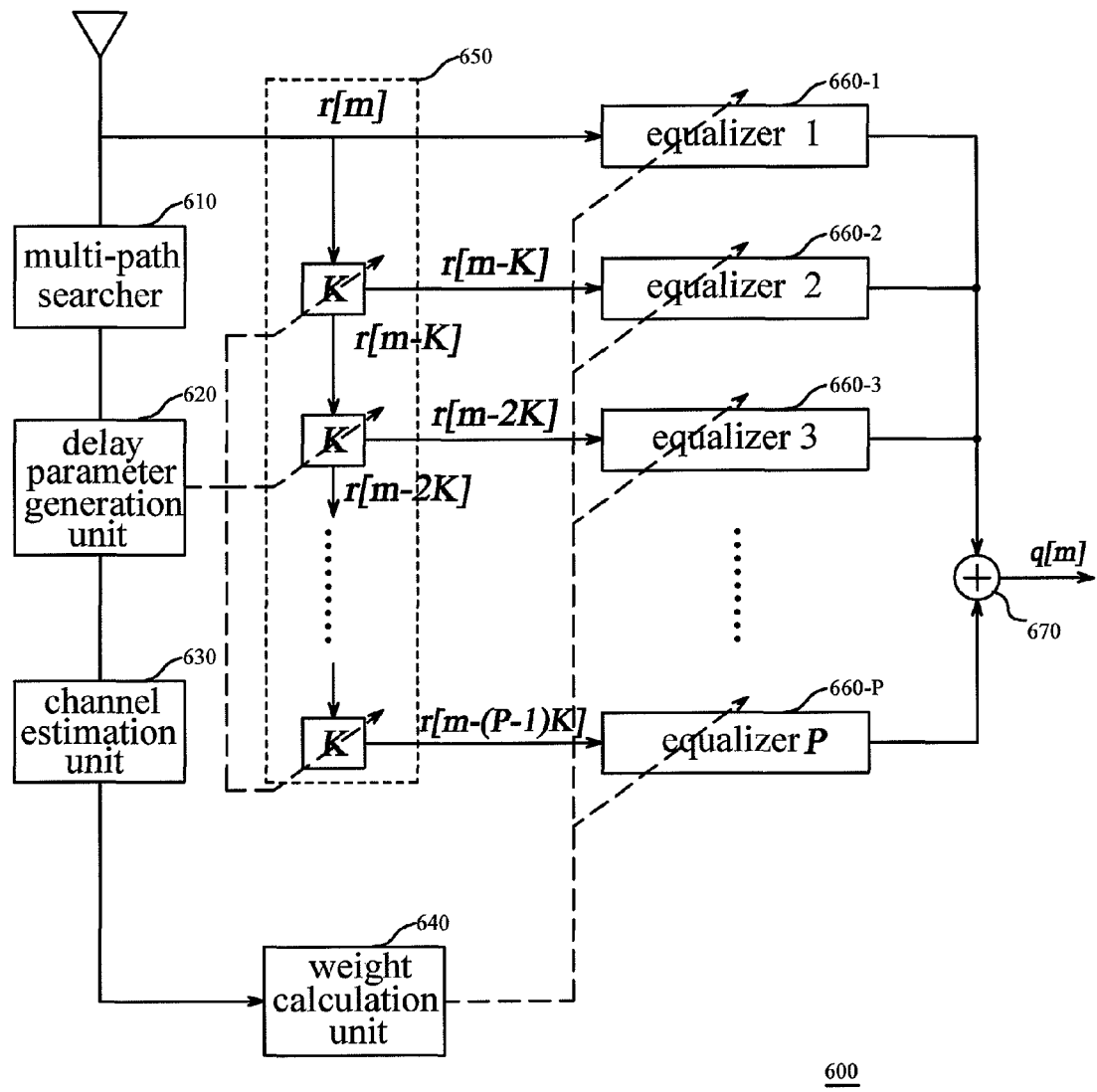
FIG. 6 is a system block diagram illustrating an equalization apparatus according to an embodiment of the present invention.

Since the weight calculation unit 520 uses the direct matrix inversion or the adaptive approach in progress of calculation of weights, the receiver 500 has to spend enormous amount of calculation or longer convergence time. In order to reduce the amount of calculation or convergence time for calculating the weights, another equalization apparatus of another embodiment is provided hereinafter as shown in FIG. 6. FIG. 6 is a system block diagram illustrating an equalization apparatus according to an embodiment of the present invention. Referring to FIG. 6, the equalization apparatus 600 includes a multi-path searcher 610, a delay parameter generating unit 620, a channel estimation unit 630, a weight calculation unit 640, a cluster delay unit 650, equalizers 660_1~660_P and a combination unit 670.

The multi-path searcher 610 scans the transmission channel to obtain the delay paths and the delay time corresponding to the delay paths. The searching result of the multi-path searcher 610 is shown in FIG. 2 as an example. Afterward, the delay parameter generating unit 620 determines the cluster number of the delay paths according to the delay time of the delay paths and determines a window interval according to the intervals of the clusters and the initial delay time of the clusters, wherein the window interval is represented as K, and the cluster number of the delay paths is represented as P.

Figure 7:
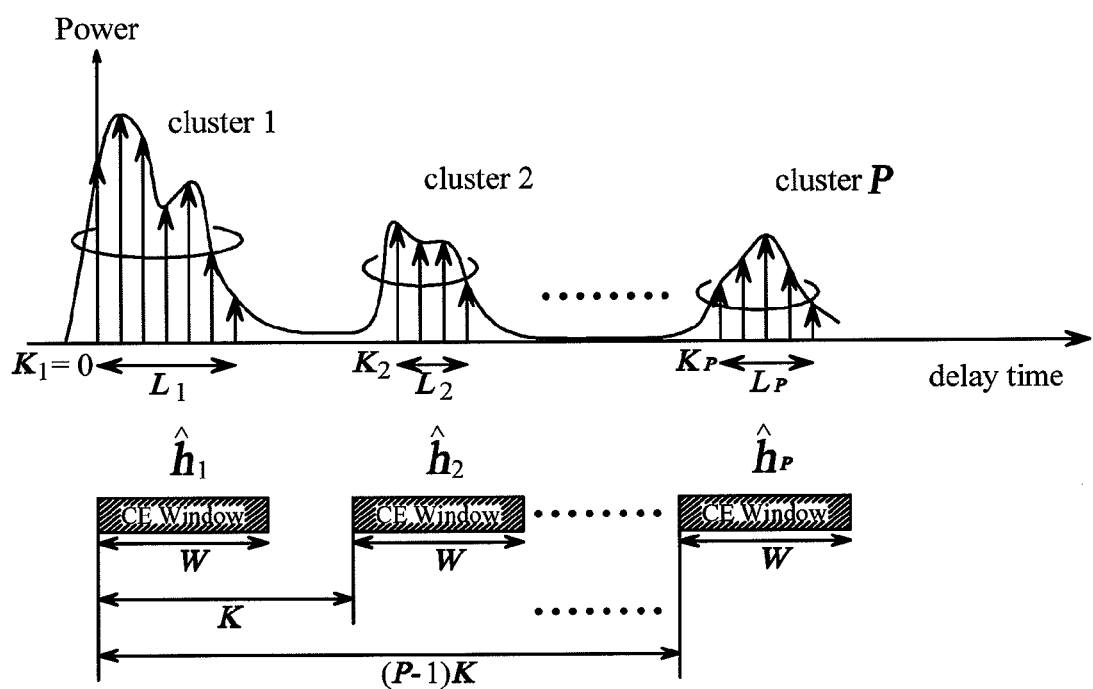
FIG. 7 is a diagram illustrating the arrangement of the channel estimation window (CE window) according to an embodiment of the present invention.

In the present embodiment, in order to reduce the amount of calculation of the equalization apparatus 600, the cluster delay unit 650 utilizes the window interval K to delay the received signal r[m] for K unit time so as to obtain a plurality of cluster delay signals r[m], r[m-K], r[m-2K], ..., r[m-(P-1)K]. And the cluster delay unit 650 respectively outputs the cluster delay signals to the first equalizer to the $P^{th}$ equalizer. In addition, in cooperation with the cluster delay unit 650 and in order to acquire adapted received signals for calculating the weight of equalizer, the channel estimation unit 630 allocates the channel estimation window (hereinafter referred to as CE window) as shown in FIG. 7. FIG. 7 is a diagram illustrating the arrangement of the channel estimation window according to an embodiment of the present invention.

Referring to FIG. 7, since the multi-path searcher 610 had already searched P clusters in the present channel, it is assumed that the channel estimation unit 630 allocates P CE windows to estimate complete channel response, wherein the length of the CE window in the channel estimation unit 630 is represented as W. The first CE window is located at the time point when the first delay path arrives to the receiver, and the delay time is zero. Afterward, the second CE window is disposed at K unit time from the first CE window, and so on. The interval between each two adjacent CE windows is K unit time. The channel estimation unit 630 utilizes P CE window to estimates P segment of channel responses. Owing to the channel estimation is prior art for a person skilled in the art, the present invention does not describe the structure of the channel estimation unit 630 in detail.

Figure 8:
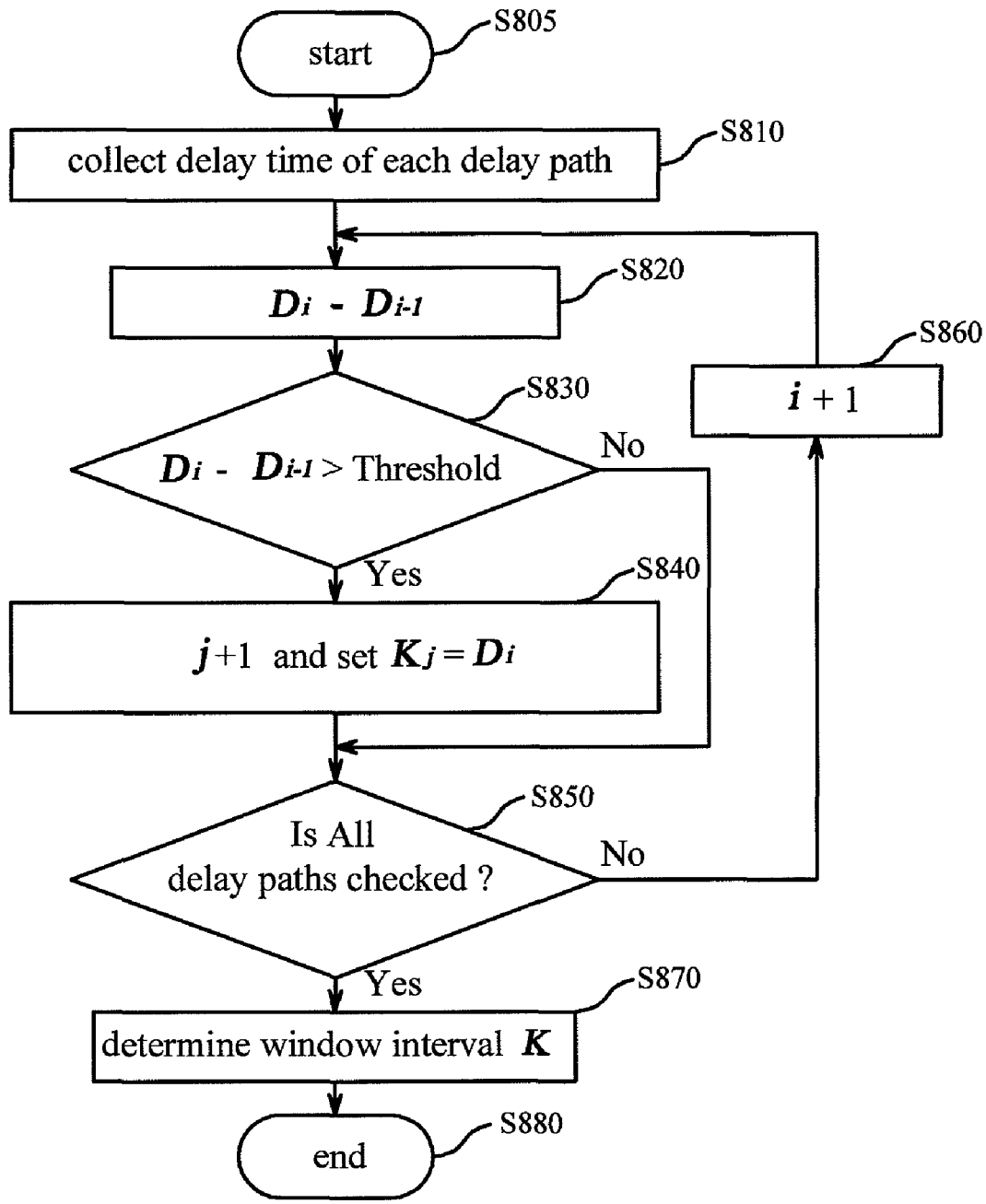
FIG. 8 is a flowchart illustrating a method for determining the window interval according to an embodiment of the present invention.

From the abovementioned operation of the channel estimation unit 630 and cluster delay unit 650, the window interval K determined by the delay parameter generating unit 620 will affect the quality of the channel estimation unit 630 and the equalizers 660_1~660_P. FIG. 8 is a flowchart illustrating a method for determining the window interval according to an embodiment of the present invention. Referring to FIG. 8, the method includes the following steps.

In step S805, the method for determination of window interval starts.

In step S810, the delay parameter generating unit 620 receives the searching result of the multi-path searcher and collects the delay time of each delay path from the channel, wherein the delay time of $i^{th}$ delay path is represented as $D_i$. These path delays are sorted in ascending order. The initial value of i is 0, that is to say, the delay time of the first delay path is represented as $D_0$.

In steps S820, the difference between the delay time of the $i^{th}$ delay path and the $(i-1)^{th}$ delay path is calculated, that is, the difference between $D_i$ and $D_{i-1}$ is calculated.

In step S830, a hypothesis is tested whether the difference between $D_i$ and $D_{i-1}$ is larger than a threshold, wherein the threshold value can be designed according to practical requirement of system.

In step S840, a cluster number counter adds one (hereinafter referred to as CN) when the difference between $D_i$ and $D_{i-1}$ is larger than the threshold value, and the delay time of the first delay path of $CN^{th}$ cluster is set to $D_i$, wherein the CN is represented as j, the delay time of the first delay path of the $j^{th}$ cluster is represented as $K_j$. $K_j = D_i$ is set in the step S840. In addition, the initial value of the CN is 1, and the delay time of the first delay path is 0, that is to say, $K_1 = 0$. For example, in the FIG. 7, it is observed that the delay time of the $7^{th}$ and the $8^{th}$ delay path is distantly long, and, the difference between $D_7$ and $D_6$ may be larger than the threshold value. Therefore, when i is equal to 7, the determination of the step S830 is positive so that $K_2 = D_7$ is set in the step S840. In addition, the hypothesis of the step S830 is false, the step S850 is directly performed.

In step S850, it is determined whether each delay path is checked.

In step S860, i plus 1 is performed.

In step S870, when each delay path is checked, a window interval K is determined according to $K_1 \sim K_3$. In addition, in the abovementioned step S870, the equalizer length, CE window length or total power of delay paths of each cluster, and so on, can be taken into account for determining of parameters of the window interval K.

In step S880, the method for determining window interval in the embodiment of the present invention ends.

Referring to FIG. 6, the weight calculation unit 640 utilizes the channel response estimated by channel estimation unit 630 to calculate the plurality of weights under MMSE criterion. Further, the first to the $P^{th}$ weights calculated by the weight calculation unit 640 are correspondingly outputted to the equalizers 660_1~660_P. For conveniently explaining the present embodiment, the number of weights outputted from the weight calculation unit 640 to each equalizer 660_1~660_P is assumed as F.

Figure 9:
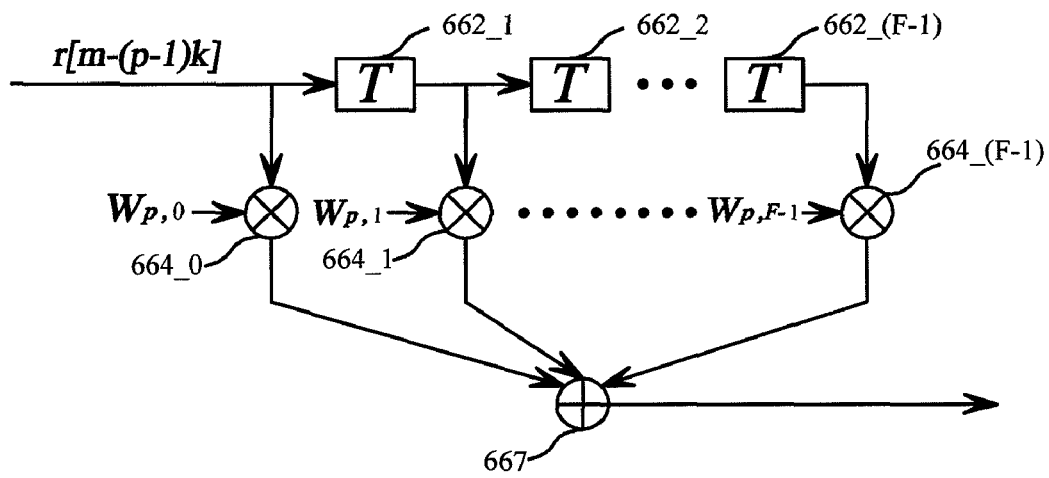
FIG. 9 is a system block diagram illustrating equalizers 660_1~660_P according to an embodiment of the present invention.

For conveniently describing the present embodiment, assuming the structure of each equalizer 660_1~660_P is composed by a FIR (Finite Impulse Response) filter as shown in FIG. 9. FIG. 9 is a system block diagram illustrating equalizers 660_1~660_P according to an embodiment of the present invention. The $p^{th}$ equalizer 660_$p$ includes (F−1) time delay apparatuses 662_1~662_(F−1), F multiplication units 664_0~664_(F−1) and a adder 667 as shown in FIG. 9. The time delay apparatuses 662_1~662_(F−1) receives the cluster delay signal r[m−(p−1)K] and sequentially delays the cluster delay signal r[m−(p−1)K] for a unit time T and then respectively outputs a plurality of subsequently-delayed signals r[m−(p−1)K−1], r[m−(p−1)K−2], . . . , r[m−(p−1)K−(F−1)]. The F multiplication units 664_0~664_(F−1) respectively multiply the cluster delay signal r[m−(p−1)K] and the subsequently-delayed signals r[m−(p−1)K−1], r[m−(p−1)K−2], . . . , r[m−(p−1)K−(F−1)] with conjugations of the corresponding weights $w_{p,0}^*$, $w_{p,1}^*$, . . . $w_{p,F-1}^*$ to obtain a plurality of multiplied signals $w_{p,0}^*$·r[m−(p−1)K], $w_{p,1}^*$·r[m−(p−1)K−1], . . . , $w_{p,F-1}^*$·r[m−(p−1)K−(F−1)]. The adder 667 adds the multiplied signals $w_{p,0}^*$·r[m−(p−1)K], $w_{p,1}^*$·r[m−(p−1)K−1], . . . , $w_{p,F-1}^*$·r[m−(p−1)K−(F−1)]. Afterward the adder 667 outputs the sum to the combination unit 670 as the $p^{th}$ equalization signal. Finally, the combination unit 670 outputs a equalized signal q[m].

In the following content, how the weight calculation unit 640 calculates the weights $\{w_1, w_2, \ldots w_P\}$ is described. According to the abovementioned description corresponding to the FIG. 7, the length of the CE windows in the channel estimation unit is W, and the interval between two adjacent CE windows is K unit time. Therefore, the received signal in equation (1) can be represented as follow.

$$r[m] = \sum_{p=1}^{P} \sum_{l=0}^{L_p-1} h[K_p + l]d[m - K_p - l] + v[m] \quad (3)$$

In order to simplify the mathematical expression, the received signal is represented in vector form as $\underline{r}[m]=(r[m]$ r[m−1] . . . r[m−F+1])$^T$. And the signal emitted from the transmitter is also represented in vector form as $\underline{d}[m]=(d[m]$ d[m−1] . . . d[m−F−W+2])$^T$. Further, the channel response estimated from the $p^{th}$ CE window of the channel estimation unit 630 is represented as $\hat{h}[pK], \hat{h}[pK+1], \ldots, \hat{h}[pK+W-1]$. For conveniently describing the present embodiment, the abovementioned channel response $\hat{h}[pK], \hat{h}[pK+1], \ldots, \hat{h}[pK+W-1]$ can be used for composing a Toeplitz matrix represented as:

$$\underline{H}_p = \begin{pmatrix} \hat{h}[pK] & \hat{h}[pK+1] & \ldots & \hat{h}[pK+W-1] & 0 & \ldots & 0 \\ 0 & \hat{h}[pK] & \hat{h}[pK+1] & \ddots & \hat{h}[pK+W-1] & \ddots & \vdots \\ \vdots & \ddots & \ddots & \ddots & \ddots & \ddots & 0 \\ 0 & \ldots & 0 & \hat{h}[pK] & \hat{h}[pK+1] & \ldots & \hat{h}[pK+W-1] \end{pmatrix} \in C^{F \times (F+W-1)}$$

wherein the mathematical symbol marked with two bottom lines is represented a matrix.

According to the abovementioned mathematical expression, the abovementioned equation (3) can be rewritten as:

$$r[m] = \sum_{p=0}^{P-1} \underline{H}_p \underline{d}[m - pK]. \quad (4)$$

Expanding the equation (4), the signal received by the equalizers 540_1~540_P can be represented in matrix form as $$\underbrace{\begin{pmatrix} \underline{r}[m] \\ \underline{r}[m-K] \\ \vdots \\ \underline{r}[m-(P-1)K] \end{pmatrix}}_{\underline{r}} = \underbrace{\begin{pmatrix} \underline{H}_0 & \underline{H}_1 & \ldots & \underline{H}_{P-1} & 0 & \ldots & 0 \\ 0 & \underline{H}_0 & \underline{H}_1 & \ldots & \underline{H}_{P-1} & \ddots & \vdots \\ \vdots & \ddots & \ddots & \ddots & \ddots & \ddots & 0 \\ 0 & \ldots & 0 & \underline{H}_0 & \underline{H}_1 & \ldots & \underline{H}_{P-1} \end{pmatrix}}_{\underline{H}} \underbrace{\begin{pmatrix} \underline{d}[m] \\ \underline{d}[m-K] \\ \vdots \\ \underline{d}[m-2(P-1)K] \end{pmatrix}}_{\underline{d}} + \underbrace{\begin{pmatrix} \underline{v}[m] \\ \underline{v}[m-K] \\ \vdots \\ \underline{v}[m-(P-1)K] \end{pmatrix}}_{\underline{v}},$$

wherein r is a received vector composed of the received signals $\underline{r}[n], \underline{r}[m-K], \ldots, \underline{r}[m-(P-1)K]$, the value thereof is $$\underline{r} = \begin{pmatrix} \underline{r}[m] \\ \underline{r}[m-K] \\ \vdots \\ \underline{r}[m-(P-1)K] \end{pmatrix}.$$

Similarly, d and v are vectors respectively composed of multiple vectors, the values thereof respectively represent $$\underline{d} = \begin{pmatrix} d[m] \\ d[m-K] \\ \vdots \\ d[m-2(P-1)K] \end{pmatrix} \text{ and } \underline{v} = \begin{pmatrix} \underline{v}[m] \\ \underline{v}[m-K] \\ \vdots \\ \underline{v}[m-(P-1)K] \end{pmatrix}.$$

The symbol $\underline{\underline{H}}$ is a matrix composed of matrices $\underline{H}_0$, $\underline{H}_1, \ldots, \underline{H}_{P-1}$. The value thereof is represented as $$\underline{\underline{H}} = \begin{pmatrix} \underline{H}_0 & \underline{H}_1 & \cdots & \underline{H}_{P-1} & 0 & \cdots & 0 \\ 0 & \underline{H}_0 & \underline{H}_1 & \cdots & \underline{H}_{P-1} & \ddots & \vdots \\ \vdots & \ddots & \ddots & \ddots & \ddots & \ddots & 0 \\ 0 & \cdots & 0 & \underline{H}_0 & \underline{H}_1 & \cdots & \underline{H}_{P-1} \end{pmatrix}.$$

The matrix $\underline{\underline{H}}$ can be catalogued a Block-Toeplitz matrix.

In the present embodiment, the equalization apparatus 600 is used for eliminating the interference of the transmission channel to the received signal. Therefore, under MMSE criterion, the equalized signal q[m] obtained based on the weights $\underline{w}_{MMSE}$ from the weight calculation 640 has to be quite similar to the transmitted signal of the transmitter. In other words, under MMSE criterion, the weights calculated from the weight calculation 640 are chosen to satisfy the following equation:

$$\underline{w}_{MMSE} = \underset{\underline{w}}{\arg\min} E\{|d[m-D] - \underline{w}^H \underline{r}|^2\} \quad (5)$$

wherein the weights are represented as $\underline{w} = (\underline{w}_1^T \underline{w}_2^T \ldots \underline{w}_P^T)^T$ in vector form, D represents a decision delay, and the superscript H represents a Hermitian operator.

In the abovementioned equation (5), $\underline{w}_{MMSE}$ can be solved via a Wiener-Hopf equation as follow:

$$\underline{w}_{MMSE} = \underline{\underline{R}}^{-1} \lfloor \underline{\underline{H}} \rfloor_D \quad (6),$$

wherein $\underline{\underline{R}}$ is defined as a autocorrelation matrix of the received vector $\underline{r}$, that is, $\underline{\underline{R}} = E\lfloor \underline{r} \cdot \underline{r}^H \rfloor$. $\lfloor \underline{h} \rfloor_D$ resents a vector stacked by the elements of $\overline{D}^{th}$ columns of $\underline{\underline{H}}$.

According to the equation (6), the weight calculation unit 640 calculates the autocorrelation matrix $\underline{\underline{R}}$ and its inverse matrix $\underline{\underline{R}}^{-1}$, and then multiply the inverse matrix $\underline{\underline{R}}^{-1}$ with the vector $\lfloor \underline{\underline{H}} \rfloor_D$. The weight calculation unit 640 may obtain the weights $\underline{w}_{MMSE}$, that is, all weights that is necessary for the equalizers 660_1~660_P is obtained. Here, if a better performance of the receiver is required to be achieved, the D value may be designed to be $(F+W-1)\cdot(P-1)+\lfloor(F+W-1)/2\rfloor$. In other words, the elements on the middle columns of the matrix $\underline{\underline{H}}$ are extracted to compose $\lfloor \underline{\underline{H}} \rfloor_D$. Furthermore, according to the definition of $\underline{\underline{H}}$, when $D=(F+W-1)\cdot(P-1)+\lfloor(F+W-1)/2\rfloor$, $\lfloor \underline{\underline{H}} \rfloor_D$ is simply obtained by concatenating the middle column of $\underline{H}_p$, which can be represented in equation (7), with p=0, 1, ..., P−1.

$$\underline{h}_p = [\underline{H}_p]_{\lfloor(F+W-1)/2\rfloor} = \begin{pmatrix} 0 \\ \hat{h}[pK+W-1] \\ \vdots \\ \hat{h}[pK+1] \\ \hat{h}[pK] \\ 0 \end{pmatrix}. \quad (7)$$

In the abovementioned equation (7), it is assumed that F is larger than W. $\underline{h}_p$ is defined as a steering vector to represent a vector composed of elements on the $((F+W-1)/2)^{th}$ column of $\underline{H}_p$. Therefore, according to the value of D defined above, $\lfloor \underline{\underline{H}} \rfloor_D$ can be represented as:

$$[\underline{\underline{H}}]_D = (\underline{h}_P^T \ldots \underline{h}_2^T \underline{h}_1^T)^T = \underline{h} \quad (8)$$

Since the received signals respectively processed by the equalizers 660_1~660_P are interfered from different clusters (Cluster 1~Cluster P) within the transmission channel, according to the derivation of the equation (6), the channel response of the first to $P^{th}$ clusters are simultaneously considered and the weights $\underline{w}_{MMSE}$ are obtained under the MMSE criterion when calculating the weights corresponding to the equalizers 660_1~660_P of the present embodiment. However, according to the equation (6), calculation of the weights requires $\underline{w}_{MMSE}$ to multiply the matrix $\underline{\underline{R}}^{-1}$ with a dimension of FP×FP and the $\lfloor \underline{\underline{H}} \rfloor_D$ with the dimension of FP×1. Moreover, a large amount of calculation is required to be performed for calculating the inverse matrix of $\underline{\underline{R}}$, so that a calculation complexity during calculation of the weights $\underline{w}_{MMSE}$ by the weight calculation unit 540 is quite intensive. Therefore, another calculation method of the weights $\underline{w}_{MMSE}$ is provided by the present embodiment for decreasing the calculation complexity of the weights $\underline{w}_{MMSE}$.

Since the signal d[m] transmitted from the transmitter is independent, and under the MMSE criterion, the auto correlation matrix $\underline{\underline{R}}$ of the received vector $\underline{r}$ may be represented as:

$$\underline{\underline{R}} = \underline{\underline{H}}\underline{\underline{H}}^H + \sigma_v^2 \underline{\underline{I}} \quad (9).$$

$\sigma_v^2$ represents a variance of the Gaussian noise, and I represents an identity matrix with a dimension of FP×FP. For conveniently describing the present embodiment, the equation (9) may be reformulated as:

$$\underline{\underline{R}} = \begin{pmatrix} \underline{R}_0 & \underline{R}_1^H & \cdots & \underline{R}_{P-1}^H \\ \underline{R}_1 & \underline{R}_0 & \ddots & \underline{R}_{P-2}^H \\ \vdots & \ddots & \ddots & \vdots \\ \underline{R}_{P-1} & \underline{R}_{P-2} & \cdots & \underline{R}_0 \end{pmatrix}. \quad (10)$$

The value of the sub-matrices on the diagonal orientation of the matrix $\underline{\underline{R}}$ is $$\underline{R}_0 = \sum_{i=0}^{P-1} \underline{H}_i \underline{H}_i^H + \sigma_v^2,$$

and the values of the rest sub-matrices of the matrix $\underline{R}$ are $$\underline{R}_p = \sum_{i=0}^{P-p-1} \underline{H}_i \underline{H}_{i+p}^H, \; p = 1, 2, \ldots, P-1.$$

According to the definition of $\underline{H}_p$, $\underline{H}_p$ is a Toeplitz matrix. Therefore, it can be derived that the structure of the above-mentioned $\underline{R}_p$ is banded and $\underline{R}_p$ is the Toeplitz matrix. Based on the document of note [2], the sub-matrix $\underline{R}_p$ of $\underline{R}$ may be approximately represented as a circulant matrix $\underline{S}_p$, wherein $\underline{S}_p$ can be decomposed as $\underline{S}_p = F^H \underline{D}_p F$. In other words, the sub-matrix $\underline{R}_p$ of $\underline{R}$ may be approximately represented as:

$$\underline{R}_p \approx F^H \underline{D}_p F \quad (11).$$

The matrix $\underline{D}_p$ in the equation (11) is a diagonal matrix, and the values thereof is $\underline{D}_p = \text{diag}\{F \cdot [\underline{S}_p]_1\}$, wherein $\text{diag}\{\underline{x}\}$ represents a diagonal matrix whose diagonal elements is composed of the element of the vector $\underline{x}$. $[108]_1$ represents a vector composed of the first column of the matrix. $F$ represents a DFT (Discrete Fourier Transform) matrix, wherein $F \cdot a$ represents to perform DFT to the vector $a$ and $F^H \cdot a$ represents to perform IDFT (Inverse Discrete Fourier Transform) to the vector $a$.

Moreover, $\underline{S}_p$ may be a circulant matrix approximated by $\underline{R}_p$. For example, $\underline{R}_p$ which is the Toeplitz matrix and has the banded structure may be expressed as:

$$\underline{R}_p = \begin{bmatrix} r_0 & r_1 & \cdots & \cdots & r_W & 0 & \cdots & \cdots & \cdots & \cdots & \cdots & \cdots & 0 \\ r_{-1} & r_0 & r_1 & \cdots & \cdots & r_W & 0 & \cdots & 0 & 0 & \cdots & \cdots & \cdots & 0 \\ r_{-2} & r_{-1} & r_0 & r_1 & \cdots & \cdots & r_W & 0 & \cdots & 0 & 0 & \cdots & \cdots & 0 \\ \vdots & \vdots & r_{-1} & \ddots & & & & & & & & & \vdots \\ \vdots & \vdots & & \ddots & & & & & & & & & 0 \\ r_{-W} & \vdots & & & \ddots & & & & & & & & 0 \\ 0 & r_{-W} & & & & \ddots & & & & & & & 0 \\ \vdots & 0 & r_{-W} & & & & \ddots & & & & & 0 & \vdots \\ \vdots & & 0 & & & & & \ddots & & & & r_W & 0 \\ \vdots & & & \ddots & & & & & \ddots & & & & r_W \\ \vdots & & & & & & & & & \ddots & & & \vdots \\ \vdots & & & & & & & & & & \ddots & r_1 & \vdots \\ \vdots & & & & \ddots & 0 & r_{-W} & & & \ddots & & r_{-1} & r_0 & r_1 \\ 0 & 0 & \cdots & \cdots & \cdots & \cdots & \cdots & 0 & r_{-W} & \cdots & \cdots & \cdots & r_{-1} & r_0 \end{bmatrix},$$

wherein the circulant matrix $\underline{S}_p$ which is approximated by $\underline{R}_p$ is expressed as:

$$\underline{S}_p = \begin{bmatrix} r_0 & r_1 & \cdots & \cdots & r_W & 0 & \cdots & 0 & 0 & r_{-W} & r_{-W+1} & \cdots & \cdots & r_{-1} \\ r_{-1} & r_0 & r_1 & \cdots & \cdots & r_W & 0 & \cdots & 0 & 0 & r_{-W} & r_{-W+1} & \cdots & r_{-2} \\ r_{-2} & r_{-1} & r_0 & r_1 & \cdots & \cdots & r_W & 0 & \cdots & 0 & 0 & r_{-W} & \ddots & \vdots \\ \vdots & \vdots & r_{-1} & \ddots & & & & & & & & & \ddots & r_{-W+1} \\ \vdots & \vdots & & \ddots & & & & & & & & & \ddots & r_{-W} \\ r_{-W} & \vdots & & & \ddots & & & & & & & & & 0 \\ 0 & r_{-W} & & & & \ddots & & & & & & & & 0 \\ \vdots & 0 & r_{-W} & & & & \ddots & & & & & 0 & \vdots \\ 0 & 0 & 0 & \ddots & & & & & & & & r_W & 0 \\ 0 & \ddots & & & & & & & & & & & r_W \\ r_W & & & & & & & & & & & & \vdots \\ \vdots & & & & & & & & & & & r_1 & \vdots \\ r_2 & \ddots & & & & 0 & r_{-W} & & & \ddots & & r_{-1} & r_0 & r_1 \\ r_1 & r_2 & \cdots & r_W & 0 & 0 & \cdots & 0 & r_{-W} & \cdots & & \cdots & r_{-1} & r_0 \end{bmatrix}$$

According to the equation (11), the autocorrelation matrix $\underline{R}$ in the equation (10) can be rewritten as:

$$\underline{R} = \begin{pmatrix} \underline{F}^H \underline{D}_0 \underline{F} & \underline{F}^H \underline{D}_1^H \underline{F} & \cdots & \underline{F}^H \underline{D}_{P-1}^H \underline{F} \\ \underline{F}^H \underline{D}_1 \underline{F} & \underline{F}^H \underline{D}_0 \underline{F} & \ddots & \underline{F}^H \underline{D}_{P-2}^H \underline{F} \\ \vdots & \ddots & \ddots & \vdots \\ \underline{F}^H \underline{D}_{P-1} \underline{F} & \underline{F}^H \underline{D}_{P-2} \underline{F} & \cdots & \underline{F}^H \underline{D}_0 \underline{F} \end{pmatrix} \quad (12)$$

$$= (\underline{I} \otimes \underline{F}^H)\underline{D}(\underline{I} \otimes \underline{F}),$$

wherein the operator $\otimes$ represent kronecker product, the matrix $$\underline{D} = \begin{pmatrix} \underline{D}_0 & \underline{D}_1^H & \cdots & \underline{D}_{P-1}^H \\ \underline{D}_1 & \underline{D}_0 & \ddots & \underline{D}_{P-2}^H \\ \vdots & \ddots & \ddots & \vdots \\ \underline{D}_{P-1} & \underline{D}_{P-2} & \cdots & \underline{D}_0 \end{pmatrix}. \quad (13)$$

According to the equation (12) and the characteristic of DFT matrix, it can obtain that the inverse matrix $\underline{R}^{-1}$ of the auto autocorrelation matrix $\underline{R}$ can be represented as:

$$\underline{R}^{-1} = (\underline{I} \otimes \underline{F}^H)\underline{D}^{-1}(\underline{I} \otimes \underline{F}) \quad (14).$$

In the abovementioned equation (14), $\underline{I}$ represents a identity matrix with dimension P×P. By substitution of the equation (14) and the equation (8) into the equation (6), the weights $\underline{w}_{MMSE}$ is:

$$\underline{w}_{MMSE} = (\underline{I} \otimes \underline{F}^H)\underline{D}^{-1}(\underline{I} \otimes \underline{F})\underline{h} \quad (15).$$

Therefore, in contrast with the equation (6), the equation (15) is more easily to implement by hardware, and the amount of calculating the weights $\underline{w}_{MMSE}$ in the equation (15) is less that in the equation (6). In the abovementioned equation (15), $(\underline{I} \otimes \underline{F}^H)$ and $(\underline{I} \otimes \underline{F})$ can be implemented by FFT (Fast Fourier Transform) and IFFT (Inverse Fast Fourier Transform). However, in the equation (15), it requires to calculate the inverse matrix $\underline{D}^{-1}$ of $\underline{D}$ with dimension FP×FP. For conveniently describing how to calculate the inverse matrix $\underline{D}^{-1}$ in the embodiments of the present invention, P=2 and F=4 are assumed for example. While P=2 and F=4, the matrix $$\underline{D} = \begin{pmatrix} \underline{D}_0 & \underline{D}_1^H \\ \underline{D}_1 & \underline{D}_0 \end{pmatrix}$$

Can be spread as:

$$\underline{D} = \begin{pmatrix} D_{0,0} & 0 & 0 & 0 & D_{1,0}^* & 0 & 0 & 0 \\ 0 & D_{0,1} & 0 & 0 & 0 & D_{1,1}^* & 0 & 0 \\ 0 & 0 & D_{0,2} & 0 & 0 & 0 & D_{1,2}^* & 0 \\ 0 & 0 & 0 & D_{0,3} & 0 & 0 & 0 & D_{1,3}^* \\ D_{1,0} & 0 & 0 & 0 & D_{0,0} & 0 & 0 & 0 \\ 0 & D_{1,1} & 0 & 0 & 0 & D_{0,1} & 0 & 0 \\ 0 & 0 & D_{1,2} & 0 & 0 & 0 & D_{0,2} & 0 \\ 0 & 0 & 0 & D_{1,3} & 0 & 0 & 0 & D_{0,3} \end{pmatrix}.$$

Since each sub-matrix $\underline{D}_p$ of the matrix $\underline{D}$ is a diagonal matrix, the inverse matrix $\underline{D}^{-1}$ is composed of four sub-matrices, wherein the four internal sub-matrices of $D^{-1}$ are also diagonal matrices. In other words, the inverse matrix $\underline{D}^{-1}$ is obtained as long as the diagonal elements in the four internal sub-matrices of the inverse matrix $D^{-1}$ are calculated when the inverse matrix $D^{-1}$ is calculating. Thus, in the following content, to calculate the diagonal elements of the sub-matrix of $D^{-1}$ is described.

First, the first element of each sub-matrix of the matrix $\underline{D}$ on the diagonal line is extracted to create a particular matrix with dimension 2×2, wherein the particular matrix can be represented as:

$$\underline{\Lambda}_0 = \begin{pmatrix} D_{0,0} & D_{1,0}^* \\ D_{1,0} & D_{0,0} \end{pmatrix}.$$

Next, the inverse matrix $\underline{\Lambda}_0^{-1}$ of the particular matrix $\underline{\Lambda}_0$ is calculated. Since the dimension of the particular matrix is 2×2, the value of the inverse matrix thereof $\underline{\Lambda}_0^{-1}$ is:

$$\underline{\Lambda}_0^{-1} = \begin{pmatrix} D_{0,0} & -D_{1,0}^* \\ -D_{1,0} & D_{0,0} \end{pmatrix} \Big/ \det(\underline{\Lambda}_0).$$

$\det(\underline{\Lambda}_0)$ represents the value of determinant of the particular matrix $\underline{\Lambda}_0$. After the inverse matrix $\underline{\Lambda}_0^{-1}$ is solved, the four elements of the inverse matrix $\underline{\Lambda}_0^{-1}$ are respectively served as the first elements of each sub-matrix from the inverse matrix $D^{-1}$ on the diagonal line.

Afterward, according to the abovementioned method, the second, third and fourth elements of each sub-matrix of the matrix $\underline{D}$ on the diagonal line are extracted to create the particular matrices $\underline{\Lambda}_1$, $\underline{\Lambda}_2$ and $\underline{\Lambda}_3$ respectively. And then the inverse matrices $\underline{\Lambda}_1^{-1}$, $\underline{\Lambda}_2^{-1}$ and $\underline{\Lambda}_3^{-1}$ are calculated. Finally, the respective four element of the inverse matrix $\underline{\Lambda}_1^{-1}$, $\underline{\Lambda}_2^{-1}$ and $\underline{\Lambda}_3^{-1}$ are respectively served as the second, third and fourth elements of each sub-matrix from the inverse matrix $D^{-1}$ on the diagonal line. As the description above, the value the inverse matrix $\underline{D}^{-1}$ expressed as the following equation (16).

$$\underline{D}^{-1} = \begin{pmatrix} \frac{D_{0,0}}{\det(\underline{\Lambda}_0)} & 0 & 0 & 0 & \frac{-D_{1,0}^*}{\det(\underline{\Lambda}_0)} & 0 & 0 & 0 \\ 0 & \frac{D_{0,1}}{\det(\underline{\Lambda}_1)} & 0 & 0 & 0 & \frac{-D_{1,1}^*}{\det(\underline{\Lambda}_1)} & 0 & 0 \\ 0 & 0 & \frac{D_{0,2}}{\det(\underline{\Lambda}_2)} & 0 & 0 & 0 & \frac{-D_{1,2}^*}{\det(\underline{\Lambda}_2)} & 0 \\ 0 & 0 & 0 & \frac{D_{0,3}}{\det(\underline{\Lambda}_3)} & 0 & 0 & 0 & \frac{-D_{1,3}^*}{\det(\underline{\Lambda}_3)} \\ \frac{-D_{1,0}}{\det(\underline{\Lambda}_0)} & 0 & 0 & 0 & \frac{D_{0,0}}{\det(\underline{\Lambda}_0)} & 0 & 0 & 0 \\ 0 & \frac{-D_{1,1}}{\det(\underline{\Lambda}_1)} & 0 & 0 & 0 & \frac{D_{0,1}}{\det(\underline{\Lambda}_1)} & 0 & 0 \\ 0 & 0 & \frac{-D_{1,2}}{\det(\underline{\Lambda}_2)} & 0 & 0 & 0 & \frac{D_{0,2}}{\det(\underline{\Lambda}_2)} & 0 \\ 0 & 0 & 0 & \frac{-D_{1,3}}{\det(\underline{\Lambda}_3)} & 0 & 0 & 0 & \frac{D_{0,3}}{\det(\underline{\Lambda}_3)} \end{pmatrix} \quad (16)$$

According to the abovementioned example, it is unnecessary to directly calculate the matrix D with dimension FP×FP into the inverse matrix $D^{-1}$. Instead, the matrix D is separated as F particular matrices $\Lambda_k$ with dimension P×P and then the inverse matrices $\Lambda_k^{-1}$ of the particular matrices $\Lambda_k$ is calculated. Therefore, the amount of calculating the inverse matrix $D^{-1}$ can be reduced. The particular matrix $\Lambda_k$ can be represented as:

$$\underline{\Lambda}_k = \begin{pmatrix} \underline{D}_0[k] & \underline{D}_1[k]^* & \cdots & \underline{D}_{P-1}[k]^* \\ \underline{D}_1[k] & \underline{D}_0[k] & \ddots & \underline{D}_{P-2}[k]^* \\ \vdots & \ddots & \ddots & \vdots \\ \underline{D}_{P-1}[k] & \underline{D}_{P-2}[k] & \cdots & \underline{D}_0[k] \end{pmatrix} \quad (17)$$

wherein $\underline{D}_p[k]$ represents the $k^{th}$ element on the diagonal line in the sub-matrix $\underline{D}_p$ of the matrix $\underline{D}$, where k=1, 2, ..., F.

According to the abovementioned derivation of the weights, the weight calculation unit 640 calculates the weights $\{w_1, w_2, \ldots, w_P\}$ under MMSE criterion. In other words, the weights of the equalizers 660_1~660_P are calculated by the gains of the delay paths from the all clusters in the whole channel. Thus, the equalizers 660_1~660_P can be used for reducing the interference caused from the different clusters of the channel to further improve the performance of the receiver.

Figure 10:
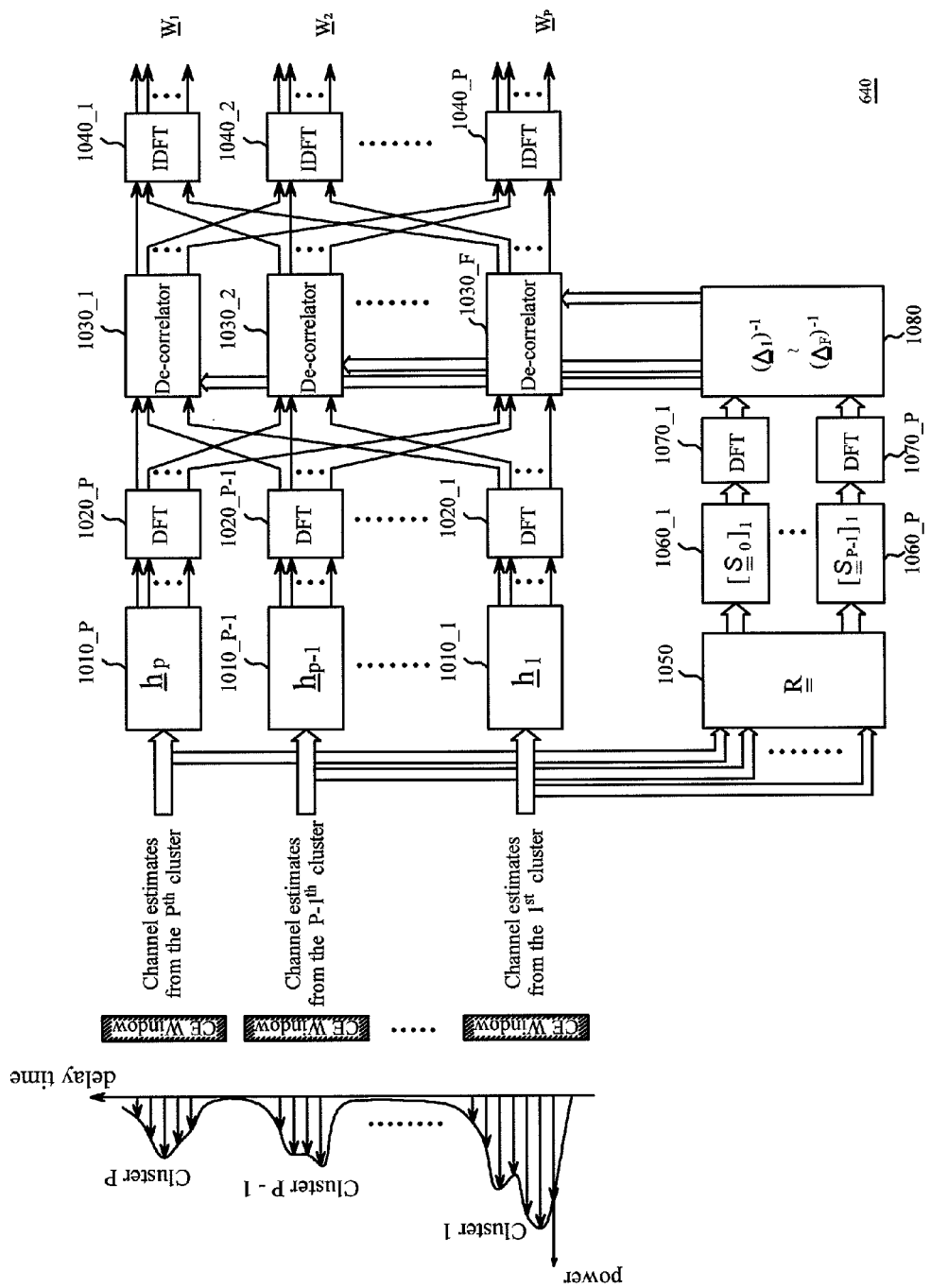
FIG. 10 is a system block diagram illustrating the weight calculation unit 640 according to an embodiment of the present invention.

FIG. 10 is a system block diagram illustrating the weight calculation unit 640 according to an embodiment of the present invention. Referring to FIG. 10, the weight calculation unit 640 includes steering vector generation units 1010_1~1010_P, Fourier transform units 1020_1~1020_P, de-correlators 1030_1~1030_F, inverse Fourier transform units 1040_1~1040_P, a correlation matrix calculation unit 1050, circulant matrix generation units 1060_1~1060_P, Fourier transform units 1070_1~1070_P and a de-correlation matrix unit 1080.

First, the steering vector generation units 1010_1~1010_P correspondingly receives channel responses estimated based on the signals extracted by P CE windows of the channel estimation unit 630 and generates steering vectors according to the channel responses. Illustrating by the example of the $p^{th}$ steering vector generation unit, the $p^{th}$ steering vector generation unit receives the channel response $\hat{h}[pK], \hat{h}[pK+1], \ldots, \hat{h}[pK+W-1]$ of the $p^{th}$ CE window and generates the steering vector $$\underline{h}_p = \begin{pmatrix} 0 \\ \hat{h}[pK+W-1] \\ \vdots \\ \hat{h}[pK+1] \\ \hat{h}[pK] \\ 0 \end{pmatrix}.$$

Next, according to the equation (15), the discrete Fourier transform matrices respectively perform DFT to each of the steering vectors to obtain $F \cdot \underline{h}_p$. Therefore, the Fourier transform units 1020_1~1020_P respectively perform DFT to the received steering vector and output F frequency components.

In addition, the correlation matrix calculation unit 1050 calculates the autocorrelation matrix R according to the channel response estimated by the channel estimation unit 630. Afterward, the circulant matrix generation units 1060_1~1060_P respectively calculates the circulant matrixes $S_0 \sim S_{P-1}$ by the sub-matrixes $R_0 \sim R_{P-1}$ from the autocorrelation matrix R and respectively extracts the first column of the circulant matrixes $S_0 \sim S_{P-1}$ to obtain $[S_0]_1 \sim [S_{P-1}]_1$. Next, the Fourier transform units respectively perform DFT to $[S_0]_1 \sim [S_{P-1}]_1$ to obtain diagnol matrices $D_0 \sim D_{P-1}$. And then the de-correlation matrix unit 1080 combines the matrices into $D_0 \sim D_{P-1}$ into the matrix D according to the abovementioned equation (13). Moreover, according to the derivation of the inverse matrix $D^{-1}$ of the matrix D, the de-correlation matrix unit 1080 generates F particular matrices $\Lambda_1 \sim \Lambda_F$ based on the matrix D and calculates F inverse matrices $(\Lambda_1)^{-1} \sim (\Lambda_F)^{-1}$ from the particular matrices according to the equation (17), and correspondingly outputs F inverse matrices $(\Lambda_1)^{-1} \sim (\Lambda_F)^{-1}$ to the de-correlators 1030_1~1030_F wherein the dimension of each inverse matrix $(\Lambda_1)^{-1} \sim (\Lambda_F)^{-1}$ is P×P.

Afterward, according to the equation (15), the inverse matrix $D^{-1}$ has to multiply $F \cdot h$ outputted from the Fourier transform units 1020_1~1020_P. Since the inverse matrix $S^{-1}$ has been decomposed to the inverse matrices $(\underline{\Lambda}_1)^{-1} \sim \underline{\Lambda}_F)^{-1}$, according to the matrix multiplication of the equation (15), the de-correlator 1030_1 receives each first frequency component from the Fourier transform units 1020_1~1020_P, and multiplies the P rows of inverse matrix $(\underline{\underline{\Lambda}}_1)^{-1}$ by the P received first frequency components to output $\overline{P}$ pieces of sum of product. The de-correlator 1030_2 receives each second frequency components outputted from the Fourier transform units 1020_1~1020_P, and multiplies the P rows of inverse matrix $(\underline{\underline{\Lambda}}_2)^{-1}$ by the P received second frequency components to output P pieces of sum of product. The de-correlator 1030_F receives each $F^{th}$ frequency components outputted from the Fourier transform units 1020_1~1020_P, and multiplies the P rows of inverse matrix $(\underline{\underline{\Lambda}}_f)^{-1}$ by the P received $F^{th}$ frequency components to output P pieces of sum of product.

According to the equation (15), the inverse Fourier transform unit 1040_1 receives each first sum of product outputted from the de-correlator 1030_1~1030_F and performs the inverse Fourier transform to the received F pieces of sum of product to output the weight $w_1$ for the equalizer 660_1. The inverse Fourier transform unit 1040_2 receives each second sum of product outputted from the de-correlator 1030_1~1030_F and performs the inverse Fourier transform to the received F pieces of sum of product to output the weight $w_2$ for the equalizer 660_2. That means, the inverse Fourier transform unit 1040_P receives each $P^{th}$ sum of product outputted from the de-correlator 1030_1~1030_F and performs the inverse Fourier transform to the received F pieces of sum of product to output the weight $w_P$ of the equalizer 660_P.

According to the operation of the weight calculation unit 640 in FIG. 10, the particular matrix $\underline{\underline{\Lambda}}_k$ is introduced in the present embodiment so that the calculation of the inverse matrix $\underline{\underline{D}}^{-1}$ from the matrix $\underline{\underline{D}}$ with dimension FP×FP unnecessary in the progress of the operation. Instead, the calculation of the inverse matrix $\underline{\underline{\Lambda}}_k^{-1}$ of the particular matrix $\underline{\underline{\Lambda}}_k$ is operated in the present embodiment. In addition, according to the operation of the weight calculation unit 640 in FIG. 10, the Fourier transform units and the inverse Fourier transform units in hardware implementation can be implemented by FFT (fast Fourier transform) to further reduce the complexity of the calculation of the weights.

One of ordinary skills in the art should know that the above-mentioned embodiments not only can apply to the transmission channel with a plurality of clusters but also apply to the transmission channel with different types. For example, when the transmission channel which has only one cluster but with densely-distributed and long-delay multi-paths, the length of the conventional equalizer is too short to cover the excessive long transmission channel. However, the equalization apparatus 600 in the abovementioned embodiment can be applied to the abovementioned channel if the window interval K is set to F which is the length of the equalizer 660_1~660_P so that the equalizer 660_1~660_P are equivalent to an equalizer with the length is KF. In addition, the correlation matrix calculation unit 1050 of the weight calculation unit 640 is accordingly adjusted. However, the adjustment of the rest elements of the equalization apparatus 600 is unnecessary.

Figure 11:
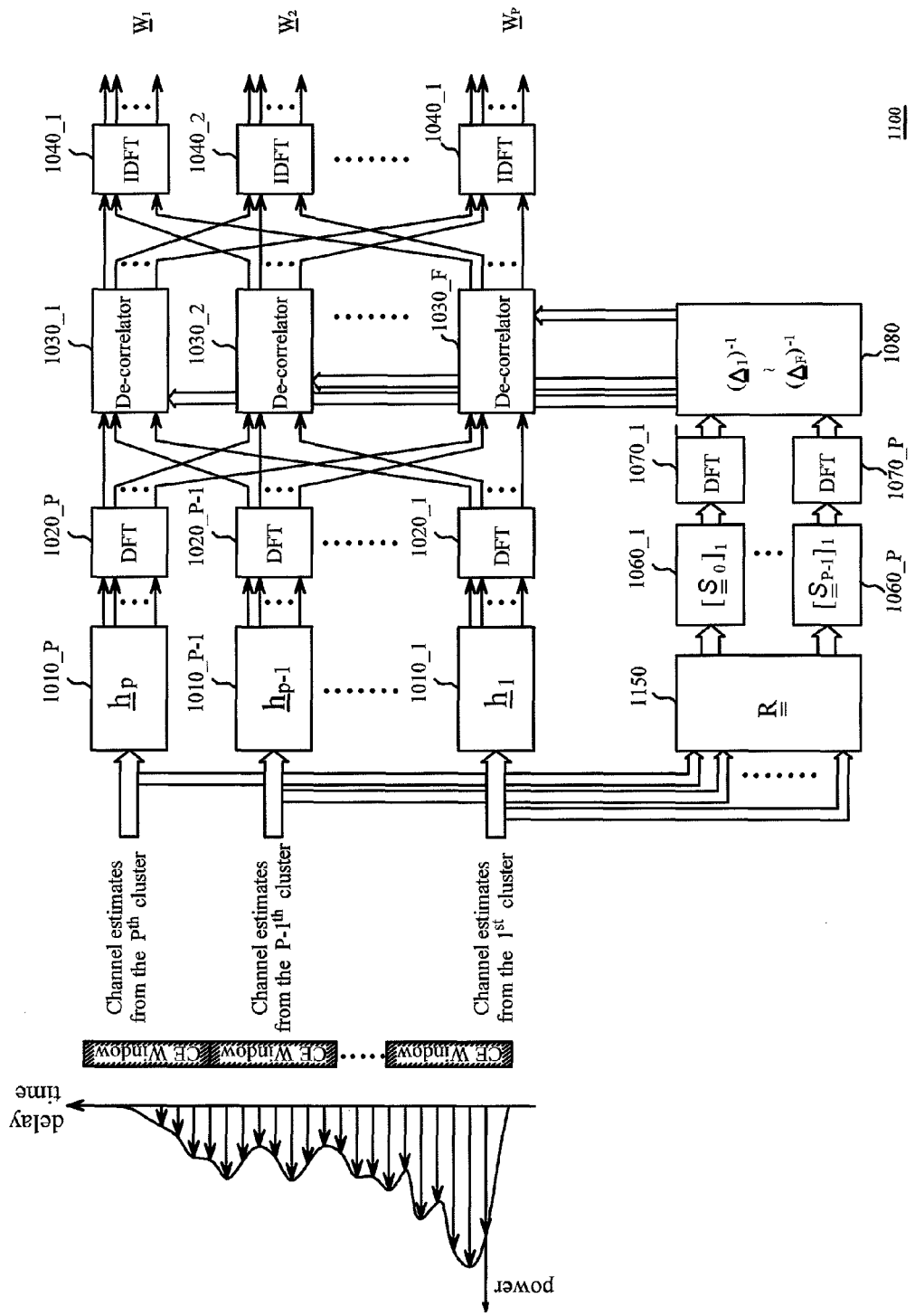
FIG. 11 is a system block diagram illustrating a weight calculation unit 1100 according to another embodiment of the present invention.

FIG. 11 is a system block diagram illustrating a weight calculation unit 1100 according to another embodiment of the present invention. Referring to FIG. 11, the elements in the weight calculation unit 1100 are similar to that of the weight calculation unit 640 in FIG. 10 so that the description on the same portion is omitted. The difference between the weight calculation unit 1100 and 640 in FIG. 10 is the correlation matrix calculation unit 1150. The correlation matrix calculation unit 1150 calculates and generates the autocorrelation matrix R based on the channel response estimated by the channel estimation unit 630, wherein $\underline{\underline{R}} = \underline{\underline{H}}\,\underline{\underline{H}}^H + \sigma_v^2 \underline{\underline{I}}$. The value of H is:

$$\underline{\underline{H}} = \begin{pmatrix} \hat{h}[0] & \hat{h}[1] & \cdots & \hat{h}[PW-1] & 0 & \cdots & 0 \\ 0 & \hat{h}[0] & \hat{h}[1] & \ddots & \hat{h}[PW-1] & \ddots & \vdots \\ \vdots & \ddots & \ddots & \ddots & \ddots & \ddots & 0 \\ 0 & \cdots & 0 & \hat{h}[0] & \hat{h}[1] & \cdots & \hat{h}[PW-1] \end{pmatrix} \in C^{PF \times (PF+PW-1)}.$$

Therefore, when the delay parameter generating unit 620 determines the transmission channel to have only one cluster but with densely-distributed long-delay multi-paths according to the searching result of the multi-path searcher 610, the delay parameter generating unit 620 determines that the window interval K is F. The firmware or the software in the weight calculation unit 640 adjusts the mathematical operation of the correlation matrix calculation unit 1150 as well so that the equalization apparatus 600 can be adapted the present channel.

Figure 12:
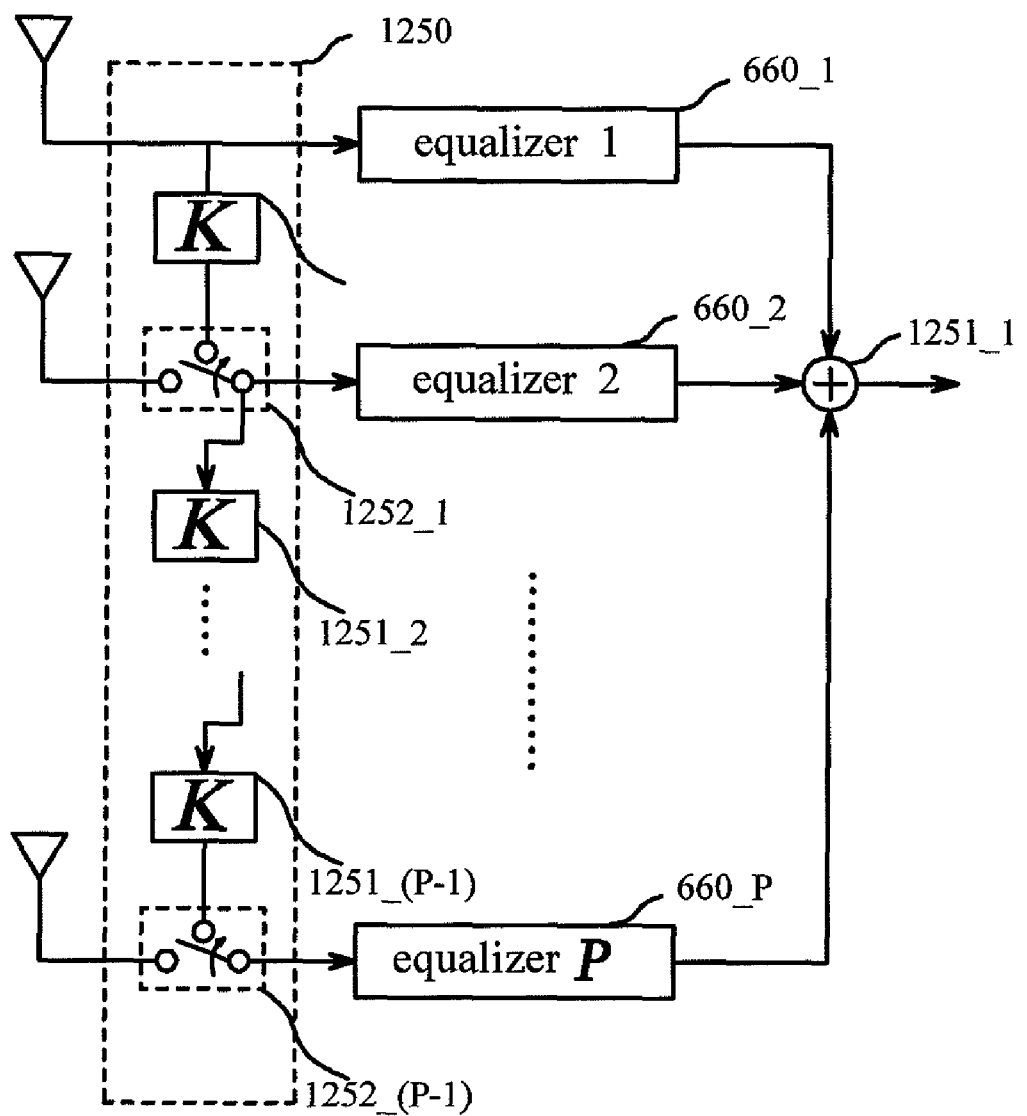
FIG. 12 is a system block diagram illustrating an equalization apparatus according to another embodiment of the present invention.

Moreover, if the receiver has a plurality of receive branches, as long as the cluster delay units 530 in the equalization apparatus 600 shown in FIG. 6 is modified, the equalization apparatus 600 can be applied to the receiver with the plurality of receive branches. FIG. 12 is a system block diagram illustrating an equalization apparatus according to another embodiment of the present invention. Referring to FIG. 12, the equalization apparatus 1200 is similar to the equalization apparatus 600 in FIG. 6, and the multi-path searcher 610, the delay parameter generating unit 620, the channel estimation unit 630 and the weight calculation unit 640 in FIG. 6 are similar to those in the equalization apparatus 1200 so that the abovementioned units are not shown in FIG. 12. The difference between the equalization apparatus 1200 and the equalization apparatus 600 in FIG. 6 is the cluster delay unit 1200 in FIG. 12. The cluster delay unit 1250 includes P-1 delay units 1251_1~1251_(P-1) and P-1 switch units 1252_1~1252_(P-1), the coupling relationship thereof is shown in FIG. 12. When the input terminal of the switch units 1252_1~1252_(P-1) is coupled to the delay units 1251_1~1251_(P-1), the operation of the cluster delay unit 1250 is the same as the cluster delay unit 530 in FIG. 6. When the receiver has a plurality of receive branches, the input terminals of the switch units 1252_1~1252_(P-1) can be switched to connect to the plurality of receive branches so that the equalizers 660_1~660_P respectively receive the received signal from the plurality of receive branches.

Figure 13:
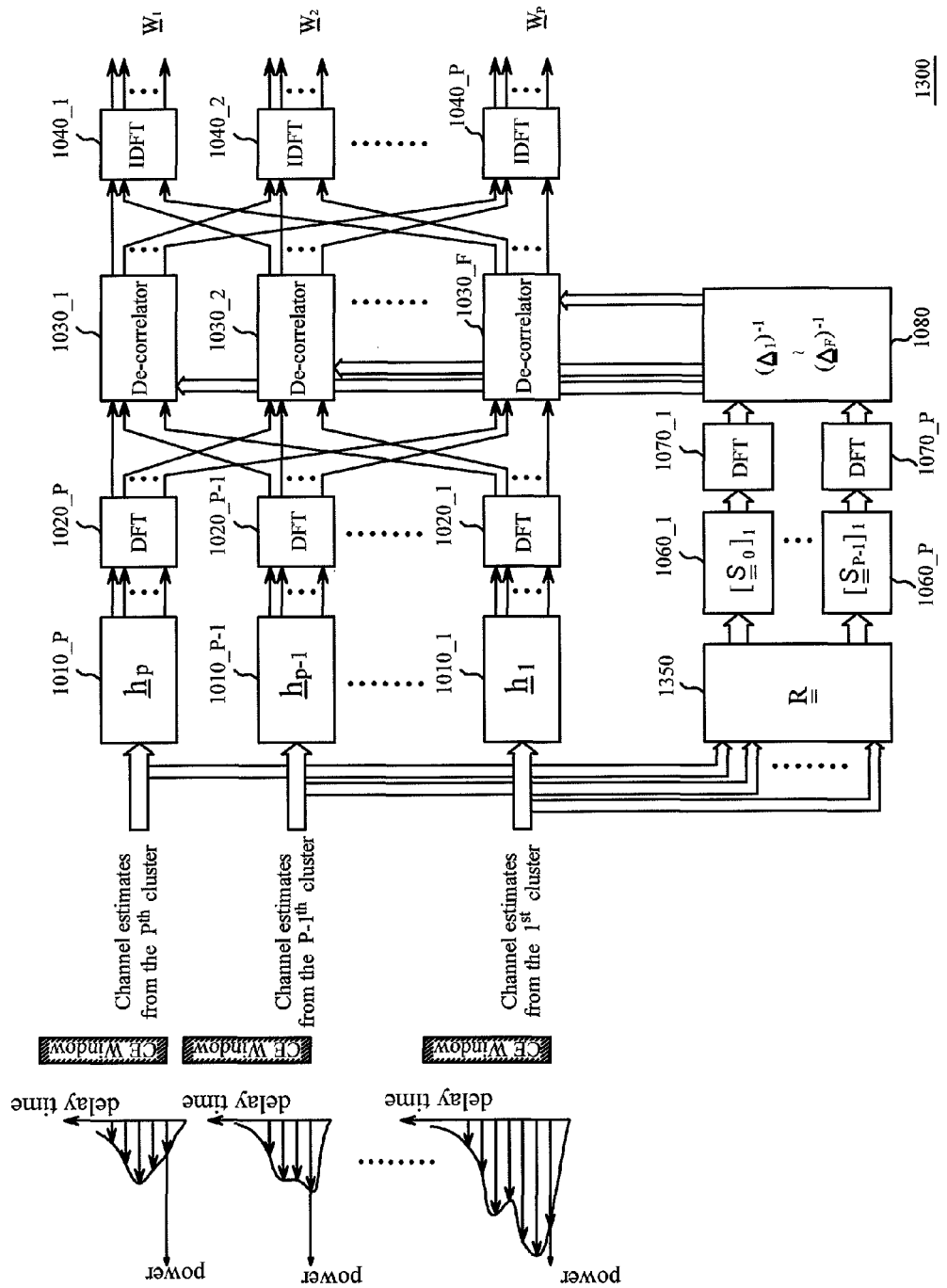
FIG. 13 is a system block diagram illustrating a weight calculation unit 1300 according to another embodiment of the present invention.

When the input terminals of the switch units are switched to connect to the plurality of receive branches, the correlation matrix calculation unit 1050 of the weight calculation unit 640 in FIG. 10 is adjusted. FIG. 13 is a system block diagram illustrating a weight calculation unit 1300 according to another embodiment of the present invention. Referring to FIG. 13, since the receiver has the plurality of receive branches, the left side of FIG. 13 illustrates the channel power delay profile obtained from the plurality of receive branches. According to the positions of the CE windows in FIG. 13, the channel estimation unit 630 respectively estimates the received signal of the each of the receive branches, and elements of the weight calculation unit 1300 are similar to those of the weight calculation unit 640 in FIG. 10. Therefore, description of the same portion is omitted. The difference between the weight calculation unit 1300 and the weight calculation unit 640 is the correlation matrix calculation unit 1350. The correlation matrix calculation unit 1350 calculates the autocorrelation matrix $\underline{\underline{R}}$ based on the channel response estimated by the channel estimation unit 630, wherein $\underline{\underline{R}} = \underline{\underline{H}}\underline{\underline{H}}^H + \sigma_v^2 I$. The value of $\underline{\underline{H}}$ is:

$$\underline{\underline{H}} = \begin{pmatrix} \underline{\underline{H}}_1 \\ \underline{\underline{H}}_2 \\ \vdots \\ \underline{\underline{H}}_P \end{pmatrix} \in C^{PF \times (F+W-1)},$$

wherein the sub-matrix $\underline{\underline{H}}_p$ of the matrix H represents the matrix composed of the estimated result which is estimated based on the received signal from the $p^{th}$ receive branch, and the value of $\underline{\underline{H}}_p$ is:

$$\underline{\underline{H}}_p = \begin{pmatrix} \hat{h}_p[0] & \hat{h}_p[1] & \cdots & \hat{h}_p[W-1] & 0 & \cdots & 0 \\ 0 & \hat{h}_p[0] & \hat{h}_p[1] & \ddots & \hat{h}_p[W-1] & \ddots & \vdots \\ \vdots & \ddots & \ddots & \ddots & \ddots & \ddots & 0 \\ 0 & \cdots & 0 & \hat{h}_p[0] & \hat{h}_p[1] & \cdots & \hat{h}_p[W-1] \end{pmatrix} \in C^{F \times (F+W-1)}.$$

Figure 14:
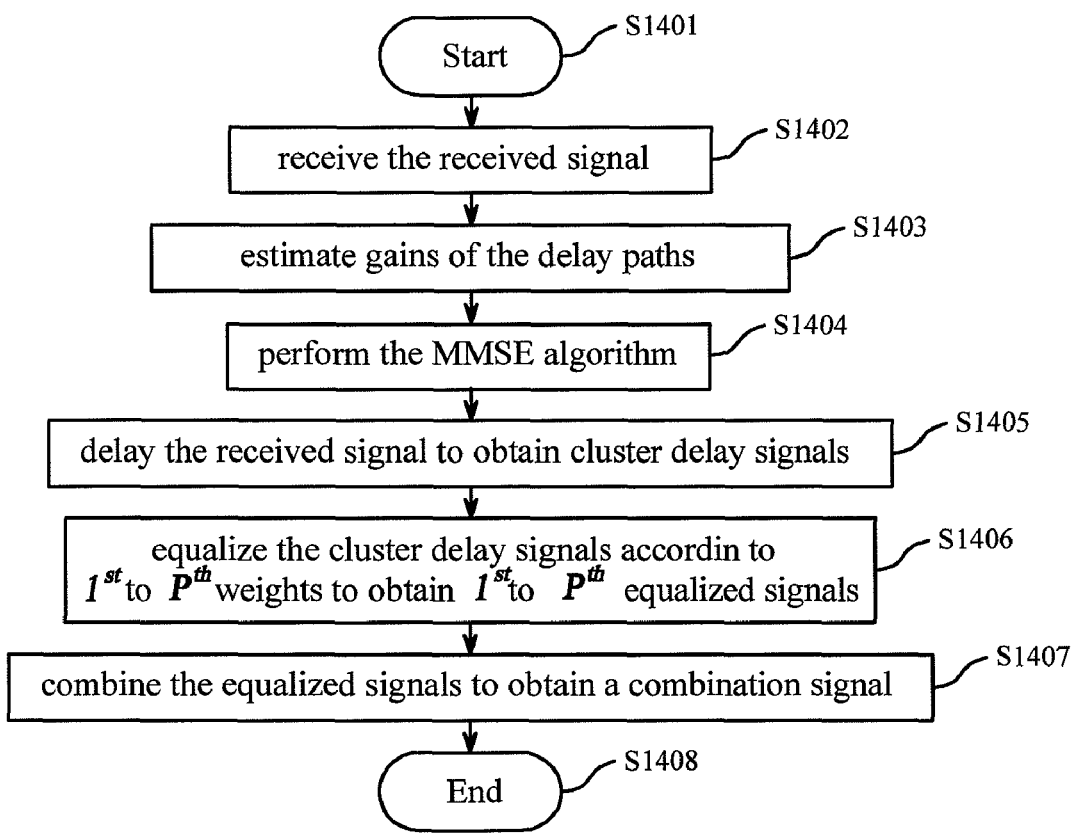
FIG. 14 is a flowchart illustrating an equalization method according to an embodiment of the present invention.

According to the operation of the equalization apparatus 505 in FIG. 5, a equalization method is provided as shown in FIG. 14. FIG. 14 is a flowchart illustrating an equalization method according to an embodiment of the present invention. Referring to FIG. 14, the method includes the steps as follow.

In step S1401, the equalization method starts.

In step S1402, the received signal from the transmitter through the transmission channel is received. The transmission channel has a plurality of delay paths, and each delay path has at least P clusters.

In step S1403, the gains of the delay paths corresponding to the P clusters are estimated.

In step S1404, a MMSE algorithm to the gains of the delay paths corresponding to the P clusters is performed to obtain a plurality of first to $P^{th}$ weights $\{\underline{w}_1, \underline{w}_2, \ldots, \underline{w}_P\}$. The abovementioned MMSE algorithm can be represented as equation (2), and the weights $\{\underline{w}_1, \underline{w}_2, \ldots, \underline{w}_P\}$ can be solved by an adaptive approach or a direct matrix inversion.

In step S1405, the received signal is respectively delayed for $K_1, K_2, K_3 \ldots K_P$ unit time to obtain a plurality of cluster delay signals $r[m-K_1], r[m-K_2], r[m-K_3] \ldots r[m-K_P]$. The abovementioned time parameter $K_1, K_2, K_3 \ldots K_P$ are determined based on the delay time of each cluster which is estimated by channel estimation technology or the delay time of each delay path which is scanned by a multi-path searcher.

In step S1406, the cluster delay signals $r[m-K_1], r[m-K_2], r[m-K_3] \ldots r[m-K_P]$ are received and the received cluster delay signals $r[m-K_1], r[m-K_2], r[m-K_3] \ldots r[m-K_P]$ is equalized according to the first to $P^{th}$ weights $\{\underline{w}_1, \underline{w}_2, \ldots, \underline{w}_P\}$ to obtain the first to $P^{th}$ equalized signals. The abovementioned equalizing operation may be shown as FIG. 9.

In step S1407, the first to $P^{th}$ equalized signals are combined and a equalized signal is outputted. The abovementioned equalized signal may be obtained by directly adding the first equalized signal to the $P^{th}$ equalized signal or by adding the first equalized signal to the $P^{th}$ equalized signal respectively with preset proportions.

In step S1408, the equalization method ends.

Figure 15:
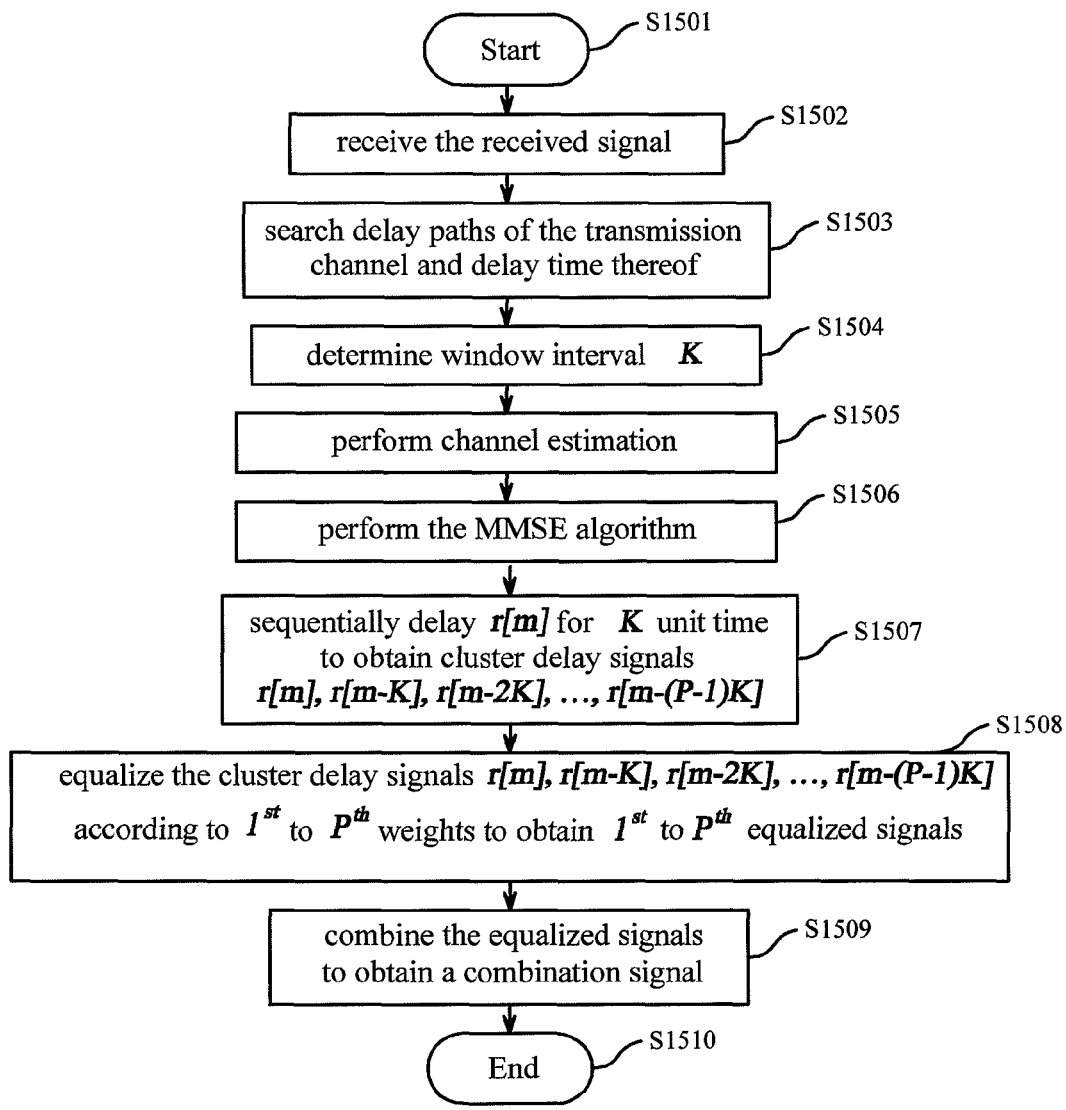
FIG. 15 is a flowchart illustrating an equalization method according to another embodiment of the present invention.

According to the operation of the equalization apparatus 600 in FIG. 6, the equalization method is provided as shown in FIG. 5. FIG. 15 is a flowchart illustrating an equalization method according to another embodiment of the present invention. Referring to FIG. 15, the method includes the steps as follow.

In step S1501, the equalization method starts.

In step S1502, the received signal from the transmitter through the transmission channel is received. The transmission channel has a plurality of delay paths, and the delay paths are at least with P clusters.

In step S1503, the delay paths of the transmission channel and the delay time of the delay paths is searched. The abovementioned step S1503 may be implemented by a multi-path searcher.

In step S1504, the number P of the cluster of the delay paths is determined according to the delay time of the delay paths and a window interval K is determined according to the interval of the clusters and the initial delay time of the clusters. In the abovementioned step S1504, the number P of the cluster and the window interval K may be determined by the abovementioned steps in FIG. 8.

In step S1505, channel estimation is performed to P cluster in the transmission channel by P CE windows. The position of the P channel estimation windows in the channel power delay profile may be shown in FIG. 7, wherein the channel response obtained from the $p^{th}$ channel estimation window is represented as $\hat{h}[_pK], \hat{h}[pK+1], \ldots, \hat{h}[pK+W-1]$.

Figure 16:
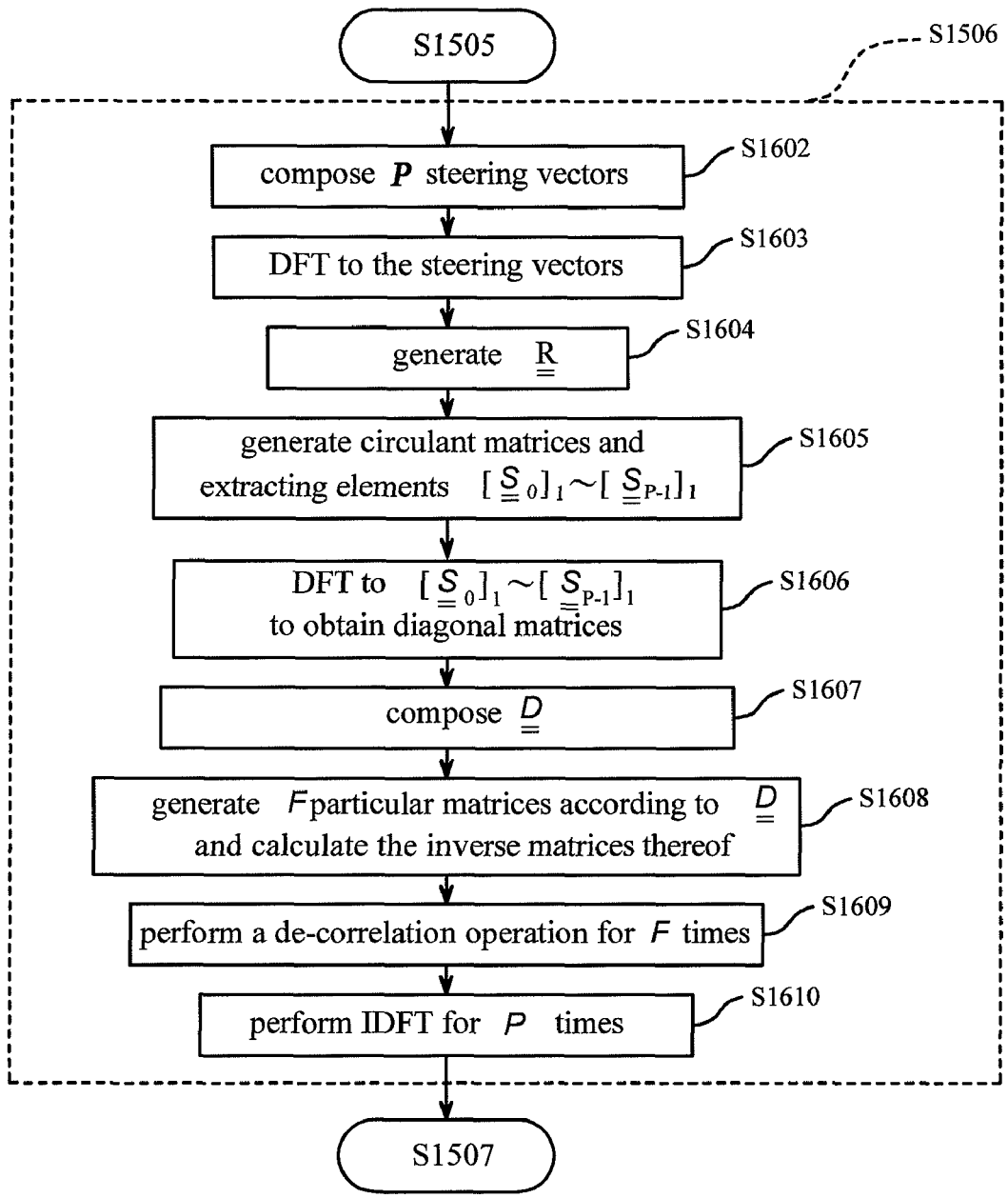
FIG. 16 is a flowchart illustrating the sub-step of the step S1506 according to an embodiment of the present invention.

In step S1506, a MMSE algorithm is performed to calculate a plurality of first weights to a plurality of $P^{th}$ weights $\{\underline{w}_1, \underline{w}_2, \ldots, \underline{w}_P\}$ according to the channel response estimated by channel estimation. The equation (6) or the equation (15) can be used for calculating the weights. When the equation (15) is used for calculating the weights $\{\underline{w}_1, \underline{w}_2, \ldots, \underline{w}_P\}$, the step S1506 includes the following steps. FIG. 16 is a flowchart illustrating the sub-step of the step S1506 according to another embodiment of the present invention. Referring to FIG. 16, the step S1506 includes the steps as follow.

In step S1602, P steering vectors is composed according to the channel response by performing the channel estimation from the P channel estimation windows, wherein the definition of steer vector is as the equation (7).

In step S1603, a discrete Fourier transform is performed to each steering vector, wherein performing the discrete Fourier transform to the $p^{th}$ steering vector $\underline{h}_p$ obtains a transforming result $F \cdot \underline{h}_p$, wherein the transforming result $F \cdot \underline{h}_p$ has F frequency components. The abovementioned step S1603 may be the operation of the Fourier transform units 1020_1~1020_P in FIG. 10.

In step S1604, the auto-correlation matrix $\underline{\bar{R}}$ is generated by the channel response obtained from the channel estimation, wherein the definition of the auto-correlation matrix $\underline{\bar{R}}$ may be as the equation (10).

In step S1605, the circulant matrixes $\underline{\bar{S}}_0 \sim \underline{\bar{S}}_{P-1}$ which are approximated to the sub-matrixes $\underline{\bar{R}}_0 \sim \underline{\bar{R}}_{P-1}$ from auto-correlation matrix $\underline{\bar{R}}$ are generated and the elements $[\underline{S}_0]_1 \sim [\underline{S}_{P-1}]_1$ on the first column of the circulant matrixes $\underline{\bar{S}}_0 \sim \underline{\bar{S}}_{P-1}$ are extracted.

In step S1606, a discrete Fourier transform is performed to the elements $[\underline{S}_0]_1 \sim [\underline{S}_{P-1}]_1$ to obtain the diagonal matrix $\underline{\bar{D}}_0 \sim \underline{\bar{D}}_{P-1}$, wherein the $p^{th}$ diagonal matrix is represented as $\underline{\bar{D}}_p = \text{diag}\{\underline{F} \cdot [\underline{S}_p]_1\}$.

In step S1607, the matrix $\underline{\bar{D}}$ is composed according to the diagonal matrix $\underline{\bar{D}}_0 \sim \underline{\bar{D}}_{P-1}$ wherein the matrix $\underline{\bar{D}}$ is defined as the equation (13) for example.

In step S1608, F particular matrixes $\underline{\bar{\Lambda}}_1 \sim \underline{\bar{\Lambda}}_F$ are respectively generated according to the matrix $\underline{\bar{D}}$ and the inverse matrixes $(\underline{\bar{\Lambda}}_1)^{-1} \sim (\underline{\bar{\Lambda}}_F)^{-1}$ of the particular matrixes are calculated, wherein the particular matrixes are defined as equation (17) for example.

In step S1609, a de-correlation operation is performed for F times. The abovementioned de-correlation operation may be implemented by the operation of the de-correlators 1030_1~1030_F in FIG. 10, wherein $i^{th}$ de-correlation operation receives each of the $i^{th}$ frequency component of the discrete Fourier transform $\underline{F} \cdot \underline{h}_p$ and correspondingly multiplies P frequency components to the elements on the $p^{th}$ row of the matrix $(\underline{\bar{\Lambda}}_i)^{-1}$ to output P pieces of sum of product, wherein i=1, 2, . . . , F.

In step S1610, an inverse discrete Fourier transform is performed for P times. The abovementioned inverse discrete Fourier transform may be implemented by the operation of the inverse discrete Fourier transform unit 1040_1~1040_P, wherein the $j^{th}$ inverse discrete Fourier transform receives the $j^{th}$ sum of product obtained from each de-correlation operation, and performs the inverse discrete Fourier transform to received F pieces of sum of product to output the weight $\underline{w}_j$, wherein j=1, 2, . . . , P.

Referring to FIG. 15, the method further includes the step as follow.

In step S1507, the received signal r[m] is sequentially delayed for K unit time to obtain the cluster delay signals r[m], r[m−K], r[m−2K], . . . , r[m−(P−1)K]. The abovementioned step S1507 may be implemented by the operation of the cluster delay unit 650 in FIG. 6.

In step S1508, the cluster delay signals r[m], r[m−K], r[m−2K], . . . , r[m−(P−1)K] is equalized according to the first to $P^{th}$ weights $\{\underline{w}_1, \underline{w}_2, \ldots, \underline{w}_P\}$ to obtain an first to $P^{th}$ equalized signal. The abovementioned equalizing operation may be implemented by the operation in FIG. 9.

In step S1509, the first to $P^{th}$ equalized signals are combined and a equalized signal is outputted. The abovementioned equalized signal may be obtained by directly adding the first equalized signal to the $P^{th}$ equalized signal or by adding the first equalized signal to the $P^{th}$ equalized signal respectively with preset proportions.

In step S1510, the equalization method ends.

In summary, the present invention includes at least the following advantages.

First, a plurality of equalizers is adopted for equalizing received signals corrupted by the channel with delay paths from different clusters. Meanwhile, the weights of the plurality of equalizers is calculated under MMSE criterion according to the gain of the whole channel so as to reduce the interference caused by the delay paths of the different clusters in whole channel.

Second, the received signal is sequentially delayed for K unit time and then the delayed signals are correspondingly outputted to the plurality of equalizers. Therefore, the cluster delay unit 530 in the present embodiment can be equivalently for extending the length of the equalization apparatus so that the interference of the transmission channel with the large delay spread can be eliminated by the equalization apparatus.

Third, the particular matrix $\underline{\bar{\Lambda}}_k$ is advised in the present invention so that the calculation of the inverse matrix $\underline{\bar{D}}^{-1}$ from the matrix $\underline{\bar{D}}$ with dimension FP×FP are unnecessary in the progress of the weight calculation, instead, the inverse matrix $\underline{\bar{\Lambda}}_k^{-1}$ of the particular matrix $\underline{\bar{\Lambda}}_k$ is calculated. Therefore, the present invention can greatly reduces the complexity of weight calculation. Moreover, when the present embodiment is actually applied to hardware, the weight calculation can be implemented by FFT (fast Fourier transform) algorithm so as to further reduce the complexity of hardware implementation.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

Note [2]: Zhang, J. Bhatt, T. and Mandyam, G., "Efficient Linear Equalization for High Data Rate Downlink CDMA Signaling," proc. of 37th IEEE Asilomar Conference on signals, Systems, and computers, Monterey, Calif., pp. 141-145, vol. 1, November 2003.

What is claimed is:

1. An equalization apparatus for receiving a received signal from a transmitter via a transmission channel in wireless communication, wherein the transmission channel has a plurality of delay paths, and the delay paths are grouped into P clusters, the equalization apparatus comprising:

a channel estimation unit, for estimating gains of the delay paths corresponding to the P clusters;

a weight calculation unit, for performing a minimum mean square error (MMSE) algorithm to the gains of the delay paths corresponding to the P clusters, so as to obtain a plurality of $N^{th}$ weights, wherein N=1, 2, . . . , P;

a cluster delay unit, for generating a plurality of cluster delayed signals by delaying the received signal for $K_1$, $K_2$, $K_3$, . . . $K_P$ unit time, wherein the received signal is represented as r[m], and the cluster delayed signals are respectively represented as $r[m-K_1]$, $r[m-K_2]$, $r[m-K_3]$ . . . $r[m-K_P]$, wherein "m" is represented as a time index;

P equalizers, for equalizing the cluster delayed signals $r[m-K_1]$, $r[m-K_2]$, $r[m-K_3]$ . . . $r[m-K_P]$ to obtain an $N^{th}$ equalized signals according to the $N^{th}$ weights;

a delay parameter generating unit, for determining number of the cluster of the delay paths according to the corresponding delay time and determining a window interval according to an interval and an initial delay time of the clusters; and a combination unit, for combining the $N^{th}$ equalized signals to a equalized signal, wherein P is larger than 2, and P, $K_1$, $K_2$, $K_3$, ..., $K_P$ and m are positive integers.

2. The equalization apparatus according to claim 1, further comprising:

a multi-path searcher, for searching the delay paths from the transmission channel and corresponding delay time.

3. The equalization apparatus according to claim 1, wherein the window interval is represented as K, and the number of the cluster is represented as P, and the cluster delay unit sequentially delays the received signal r[m] for K unit time to generate the cluster delayed signals r[m], r[m−K], r[m−2K], ..., r[m−(P−1)K].

4. The equalization apparatus according to claim 3, wherein the channel estimation unit has P channel estimation windows, length of the channel estimation windows are respectively represented as W, the channel response of $p^{th}$ channel estimation window estimated by the channel estimation unit is represented as $\hat{h}[pK], \hat{h}[pK+1], ..., \hat{h}[pK+W−1]$, where p=0, 1, ..., P−1, the number of each weights is F, the weights are represented as $w=(w_1^T w_2^T ... w_P^T)^T$, wherein the $p^{th}$ weights is represented as $\overline{w}_p = [w_{p,0}\ w_{p,1}\ ...\ w_{p,F-1}]^T$, the weight calculation unit calculates the weights $w=(w_1^T w_2^T ... w_P^T)^T$ by the equation $w=R^{-1}[H]_D$, wherein $\overline{R}$ represents an autocorrelation matrix of a received vector r, the autocorrelation matrix $R=E[r \cdot r^H]$, the received vector $$r = \begin{pmatrix} r[m] \\ r[m-K] \\ \vdots \\ r[m-(P-1)K] \end{pmatrix},$$

wherein the sub-vector of the received vector $r[m]=(r[m]\ r[m−1]\ ...\ r[m−F+1])^T$, the matrix $$H = \begin{pmatrix} H_0 & H_1 & \cdots & H_{P-1} & 0 & \cdots & 0 \\ 0 & H_0 & H_1 & \cdots & H_{P-1} & \ddots & \vdots \\ \vdots & \ddots & \ddots & \ddots & \ddots & \ddots & 0 \\ 0 & \cdots & 0 & H_0 & H_1 & \cdots & H_{P-1} \end{pmatrix},$$

wherein the sub-matrix of H is $$H_p = \begin{pmatrix} \hat{h}[pK] & \hat{h}[pK+1] & \cdots & \hat{h}[pK+W-1] & 0 & \cdots & 0 \\ 0 & \hat{h}[pK] & \hat{h}[pK+1] & \ddots & \hat{h}[pK+W-1] & \ddots & \vdots \\ \vdots & \ddots & \ddots & \ddots & \ddots & \ddots & 0 \\ 0 & \cdots & 0 & \hat{h}[pK] & \hat{h}[pK+1] & \cdots & \hat{h}[pK+W-1] \end{pmatrix} \in C^{F \times (F+W-1)},$$

$[H]_D$ represents a vector stacked by elements of $D^{th}$ column of $H$, D is a decision delay, the value of the decision delay D is $(F+W−1) \cdot (P−1)+[(F+W−1)/2]$.

5. The equalization apparatus according to claim 4, wherein the weight calculation unit calculates the $N^{th}$ weights according to the equation $w=(I \otimes F^H)D^{-1}(I \otimes F)[H]_D$, wherein I represents an identity matrix with the dimension of P×P, F represents a discrete Fourier transform (DFT) matrix, the matrix $$D = \begin{pmatrix} D_0 & D_1^H & \cdots & D_{P-1}^H \\ D_1 & D_0 & \ddots & D_{P-2}^H \\ \vdots & \ddots & \ddots & \vdots \\ D_{P-1} & D_{P-2} & \cdots & D_0 \end{pmatrix},$$

where the matrix D comprises P−1 diagonal matrixes $D_0 \sim D_{P-1}$, the $p^{th}$ diagonal matrix $D_p = \text{diag}\{F \cdot [S_p]_1\}$, $\text{diag}\{x\}$ represents a diagonal matrix, the diagonal elements thereof are composed of elements of a vector x, $S_p$ is a circulant matrix approximated by the sub-matrix $\overline{R}_p$ of the autocorrelation matrix R, where $$R = \begin{pmatrix} R_0 & R_1^H & \cdots & R_{P-1}^H \\ R_1 & R_0 & \ddots & R_{P-2}^H \\ \vdots & \ddots & \ddots & \vdots \\ R_{P-1} & R_{P-2} & \cdots & R_0 \end{pmatrix},$$

the sub-matrix on the diagonal line of the autocorrelation matrix R is represented as $$R_0 = \sum_{i=0}^{P-1} H_i H_i^H + \sigma_v^2,$$

the rest sub-matrix thereof is represented as $$R_p = \sum_{i=0}^{P-p-1} H_i H_{i+p}^H,\ p=1, 2, ..., P-1,$$

wherein the superscript H represents a Hermitian operation, $\sigma_v^2$ represents a variance of a Gaussian noise.

6. The equalization apparatus according to claim 5, wherein the weight calculation unit comprises:

P steering vector generation units, for correspondingly receiving the estimated channel responses, which are estimated by a signal acquired by the P channel estimation windows of the channel estimation unit, to generate P steering vectors;

P Fourier transform units, for performing the Fourier transform to the steering vectors to output F frequency components;

a correlation matrix calculation unit, for generating the autocorrelation matrix $\bar{R}$ according to the channel response estimated by the channel estimation unit;

P circulant matrix generation units, for calculating the circulant matrixes $\underline{S}_0 \sim \underline{S}_{P-1}$ respectively similar to the sub-matrixes $\bar{R}_0 \sim \bar{R}_{P-1}$ of the autocorrelation matrix $\bar{R}$ and extracting the first column of the circulant matrixes $\underline{S}_0 \sim \underline{S}_{P-1}$ to respectively output $[\underline{S}_0]_1 \sim [\underline{S}_{P-1}]_1$;

P Fourier transform units, for performing the discrete Fourier transform to $[\underline{S}_0]_1 \sim [\underline{S}_{P-1}]_1$ to obtain the diagonal matrixes $\underline{D}_0 \sim \underline{D}_{P-1}$;

a de-correlation matrix unit, for generating a matrix $\underline{D}$ composed of the diagonal matrixes $\underline{D}_0 \sim \underline{D}_{P-1}$ and generating F particular matrixes $\underline{\Lambda}_1 \sim \underline{\Lambda}_F$ according to the matrix $\underline{D}$, and then calculating the inverse matrixes of the particular matrixes $(\underline{\Lambda}_1)^{-1} \sim (\underline{\Lambda}_F)^{-1}$, wherein the $k^{th}$ particular matrixes is represented as $$\underline{\Lambda}_k = \begin{pmatrix} \underline{D}_0[k] & \underline{D}_1[k]^* & \cdots & \underline{D}_{P-1}[k]^* \\ \underline{D}_1[k] & \underline{D}_0[k] & \ddots & \underline{D}_{P-2}[k]^* \\ \vdots & \ddots & \ddots & \vdots \\ \underline{D}_{P-1}[k] & \underline{D}_{P-2}[k] & \cdots & \underline{D}_0[k] \end{pmatrix},$$

$\underline{D}_p[k]$ represents the $k^{th}$ element on the diagonal line of the diagonal matrix $\underline{D}_p$, where $k=1, 2, \ldots, F$;

F de-correlators, correspondingly receiving the inverse matrixes of the F particular matrixes $(\underline{\Lambda}_1)^{-1} \sim (\underline{\Lambda}_F)^{-1}$ wherein the $i^{th}$ de-correlator receives the $i^{th}$ frequency component from the Fourier transform units, and respectively multiplies P pieces of the received frequency components by elements of the $P^{th}$ row from the matrix $(\underline{\Lambda}_i)^{-1}$ to output P pieces of sum of product, where $i=1, 2, \ldots, F$;

P inverse Fourier transform units, wherein the $j^{th}$ inverse Fourier transform unit receives the $j^{th}$ sum of product from the de-correlators and performs the inverse Fourier transform to F pieces of the received sum of product to output the weights $w_j$, where $j=1, 2, \ldots, P$.

7. The equalization apparatus according to claim 3, wherein the cluster delay unit further comprises (P−1) delay units, and the delay units respectively including an input terminal and an output terminal, where the input terminal of the $1^{st}$ delay unit receives the received signal r[m], the input terminal of the $u^{th}$ delay unit is coupled to the output terminal of the $(u-1)^{th}$ delay unit, where $u=2, \ldots, P-1$, and each said delay unit respectively delays the signal received from the input terminal thereof for K unit time.

8. The equalization apparatus according to claim 3, wherein the equalization apparatus receives the received signals from P diversity branches, and the cluster delay unit comprises:

(P−1) delay units, for delaying the signal for K unit time; and (P−1) switch units, respectively having a first input terminal, a second input terminal and an output terminal, wherein the first input terminal of the $v^{th}$ switch unit is coupled to a $(v+1)^{th}$ diversity antenna, the second input terminal of the $v^{th}$ switch unit is coupled to the output terminal of the $v^{th}$ delay unit, the output terminal of the $v^{th}$ switch unit outputs the corresponding cluster delay signal, and $v=1, 2, \ldots, P-1$.

9. The equalization apparatus according to claim 3, wherein the number of $p^{th}$ weights is F, F, the $p^{th}$ weights are respectively represented as $w_{p,0}, w_{p,1}, \ldots, w_{p,F-1}$, where $p=0, 1, \ldots, P-1$, the equalizers respectively comprise:

(F−1) time delay apparatuses, respectively comprising an input terminal and an output terminal, wherein the input terminal of the $1^{st}$ time delay apparatus receives the cluster delay signal r[m−(p−1)K], and the input terminal of the $y^{th}$ time delay apparatus is coupled to the output terminal of the $(y-1)^{th}$ time delay apparatus, for delaying the signal received thereof for a unit time, where $y=2, 3, \ldots, F-1$;

F multiplication units, respectively comprising a first input terminal, a second input terminal and an output terminal, wherein the first terminal of the $1^{st}$ multiplication unit receives the said cluster delay signal r[m−(p−1)K], the first terminal of the $z^{th}$ multiplication unit is coupled to the output terminal of the $(z-1)^{th}$ multiplication unit, where $z=2, 3, \ldots, F$, and the second terminals of the multiplication units respectively receive the $p^{th}$ weights, wherein the second terminal of the $g^{th}$ multiplication unit receives the weight $w_{p,g-1}$ of the $p^{th}$ weights, where $g=1, 2, \ldots, F$, for calculating a multiplication of the received signal from the first input terminal thereof and the conjugate transpose of the weight from the second terminal thereof; and an adder, for receiving the signals from the multiplication units to obtain the $p^{th}$ equalizing signal.

10. A equalization method applied in a wireless communication, wherein a transmission channel of the wireless communication is used to transmit a received signal, the transmission channel comprises a plurality of delay paths, the delay paths are grouped into P clusters, the equalization method comprises:

estimating gains of the delay paths corresponding to the P clusters;

performing an minimum mean square error (MMSE) algorithm to the gains of the delay paths corresponding to the P clusters to obtain a plurality of $N^{th}$ weights;

delaying the received signal for $K_N$ unit time respectively to obtain a plurality of cluster delay signals, wherein the received signal is represented as r[m], where m is represented as a time index, wherein the cluster delay signals are respectively represented as r[m−$K_N$] respectively;

equalizing the cluster delay signals according to the $N^{th}$ weights to obtain an $N^{th}$ equalized signal;

combining the $N^{th}$ equalized signal to a equalized signal;

searching the delay paths from the transmission channel and corresponding delay time; and determining a number of the clusters of the delay paths according to the corresponding delay time and determining a window interval according to an interval and an initial delay time of the clusters; and wherein P is a natural number, and P is larger than 2, and $K_N$ and m are integer, where $N=1 \sim P$.

11. The equalization method according to claim 10, wherein the delay time of the $i^{th}$ path from the transmission channel is represented as $D_i$, and the step of determining the window interval comprises:

a). setting the initial value of i to 1;

b). calculating a difference between $D_i$ and $D_{i-1}$;

c). determining whether difference between $D_i$ and $D_{i-1}$ is larger than a threshold value, if the determination is positive, performing the step d) and the step e), otherwise, skipping the step d) and performing the step e);

d) adding 1 to a cluster number counter represented as CN, and setting the delay time of the $1^{st}$ delay path of a $CN^{th}$ cluster to $D_i$;

e) determining whether all delay paths are searched, if the determination is negative, performing the step f) and going back to the step b), otherwise performing the step g);

$$\underline{H} = \begin{pmatrix} \underline{H}_0 & \underline{H}_1 & \cdots & \underline{H}_{P-1} & 0 & \cdots & 0 \\ 0 & \underline{H}_0 & \underline{H}_1 & \cdots & \underline{H}_{P-1} & \ddots & \vdots \\ \vdots & \ddots & \ddots & \ddots & \ddots & \ddots & 0 \\ 0 & \cdots & 0 & \underline{H}_0 & \underline{H}_1 & \cdots & \underline{H}_{P-1} \end{pmatrix},$$

wherein the equation of the sub-matrix of the matrix $\underline{H}$ is represented as $$\underline{H}_p = \begin{pmatrix} \hat{h}[pK] & \hat{h}[pK+1] & \cdots & \hat{h}[pK+W-1] & 0 & \cdots & 0 \\ 0 & \hat{h}[pK] & \hat{h}[pK+1] & \ddots & \hat{h}[pK+W-1] & \ddots & \vdots \\ \vdots & \ddots & \ddots & \ddots & \ddots & \ddots & 0 \\ 0 & \cdots & 0 & \hat{h}[pK] & \hat{h}[pK+1] & \cdots & \hat{h}[pK+W-1] \end{pmatrix} \in C^{F \times (F+W-1)}$$

f) adding 1 to i; and g) determining the window interval according to the delay time of the $1^{st}$ delay path of the cluster corresponding to each cluster number counter.

12. The equalization method according to claim 10, wherein the window interval is represented as K, the number of the clusters of the delay paths is represented as P and said $K_N = (N-1)K$, where $N=1{\sim}P$, the step of obtaining the plurality of cluster delay signals comprises:

sequentially delay the received signal r[m] for K unit time to obtain the cluster delay signals $r[m-K_N]$.

13. The equalization method according to claim 12, further comprising:

providing P channel estimation windows, wherein the length of the channel estimation windows is represented as W, and the interval of the adjacent channel estimation windows is K unit time;

wherein the step of estimating gains corresponding to the delay paths further comprises:

performing the channel estimation to the P clusters from the transmission channel by the P channel estimation windows, wherein the channel response obtained from the $p^{th}$ channel estimation window is represented as $\hat{h}[pK], \hat{h}[pK+1], \ldots, \hat{h}[pK+W-1]$, where $p=0, 1, \ldots, P-1$.

14. The equalization method according to claim 13, wherein a number of the $N^{th}$ weights is F and the $N^{th}$ weights is represented as $\underline{w} = (\underline{w}_1^T \ \underline{w}_2^T \ \ldots \ \underline{w}_P^T)^T$, where $\underline{w}_p = [w_{p,0} \ w_{p,1} \ \ldots \ w_{p,F-1}]^T$, the step of performing the MMSE algorithm to the gains corresponding to the delay paths of the P clusters to obtain the plurality of $N^{th}$ weights $\underline{w} = (\underline{w}_1^T \ \underline{w}_2^T \ \ldots \ \underline{w}_P^T)^T$ comprises:

calculating the $N^{th}$ weights by utilizing the equation $\underline{w} = \underline{R}^{-1}[\underline{H}]_D$;

wherein $\underline{R}$ is represented as an auto correlation matrix of a received vector $\underline{r}$, where $\underline{R} = E[\underline{r} \cdot \underline{r}^H]$, the equation of the received vector $\underline{r}$ is represented as $$\underline{r} = \begin{pmatrix} \underline{r}[m] \\ \underline{r}[m-k] \\ \vdots \\ \underline{r}[m-(P-1)K] \end{pmatrix},$$

wherein the sub-vector of the received vector $\underline{r}$ is represented as $\underline{r}[m] = (r[m] \ r[m-1] \ \ldots \ r[m-F+1])^T$, where $[\underline{H}]_D$ represents the vector in the $D^{th}$ column of the matrix $\underline{H}$, D is a decision delay, and the value of D is represent as the equation $$D = (F+W-1) \cdot (P-1) + [(F+W-1)/2].$$

15. The equalization method according to claim 14, wherein the step of performing the MMSE algorithm to the gains corresponding to the delay paths of the P clusters to obtain the plurality of $N^{th}$ weights $\underline{w} = (\underline{w}_1^T \ \underline{w}_2^T \ \ldots \ \underline{w}_P^T)^T$ comprises:

calculating the $N^{th}$ weights $\underline{w} = (\underline{w}_1^T \ \underline{w}_2^T \ \ldots \ \underline{w}_P^T)$ by utilizing the equation $\underline{w} = (I \otimes F^H) \underline{D}^{-1} (I \otimes F)[\underline{H}]_D$, wherein I represents identity matrix with dimension P×P, F represent a discrete Fourier transform matrix, and the matrix $\underline{D}$ is represented as $$\underline{D} = \begin{pmatrix} \underline{D}_0 & \underline{D}_1^H & \cdots & \underline{D}_{P-1}^H \\ \underline{D}_1 & \underline{D}_0 & \ddots & \underline{D}_{P-2}^H \\ \vdots & \ddots & \ddots & \vdots \\ \underline{D}_{P-1} & \underline{D}_{P-2} & \cdots & \underline{D}_0 \end{pmatrix},$$

where the matrix $\underline{D}$ comprises P−1 diagonal matrixes $\underline{D}_0 \sim \underline{D}_{P-1}$, wherein $p^{th}$ diagonal matrix is represented as $\underline{D}_p = \text{diag}\{F \cdot [\underline{S}_p]_1\}$, the equation diag$\{\underline{x}\}$ represents a diagonal matrix, wherein the diagonal elements thereof are composed of elements of a vector $\underline{x}$, wherein the matrix $\underline{S}_p$ is a circulant matrix similar to the sub-matrix $\underline{R}_p$ of the said autocorrelation matrix $\underline{R}$, $$\underline{R} = \begin{pmatrix} \underline{R}_0 & \underline{R}_1^H & \cdots & \underline{R}_{P-1}^H \\ \underline{R}_1 & \underline{R}_0 & \ddots & \underline{R}_{P-2}^H \\ \vdots & \ddots & \ddots & \vdots \\ \underline{R}_{P-1} & \underline{R}_{P-2} & \cdots & \underline{R}_0 \end{pmatrix},$$

wherein the sub-matrix on the diagonal line of R is represented as $$\underline{R}_0 = \sum_{i=0}^{P-1} \underline{H}_i \underline{H}_i^H + \sigma_v^2,$$

the rest sub-matrix thereof is represented as $$\underline{R}_p = \sum_{i=0}^{P-p-1} \underline{H}_i \underline{H}_{i+p}^H, \quad p = 1, 2, \ldots, P-1,$$

wherein the superscript H represents a Hermitian operation, and $\sigma_v^2$ represents a variance of a Gaussian noise.

16. The equalization method according to claim 15, wherein the step of performing the MMSE algorithm to the gains corresponding to the delay paths of the P clusters to obtain the plurality of $N^{th}$ weights $\underline{w} = (\underline{w}_1^T \underline{w}_2^T \ldots S\underline{w}_P^T)^T$ comprises:

performing the channel estimation;
composing P steering vectors according to the channel response by the channel estimation estimated from the P channel estimation windows;
performing a discrete Fourier transform to the steering vectors, wherein the discrete Fourier transform is performed to the $p^{th}$ steering vector $\underline{h}_p$ to obtain $F \cdot \underline{h}_p$ and generate F frequency components;
generating the auto-correlation matrix R by utilizing the channel response from the channel estimation;
calculating circulant matrixes $S_0 \sim S_{P-1}$ respectively similar to the sub-matrices $\underline{R}_0 \sim \underline{R}_{P-1}$ from the autocorrelation matrix R and extracting the elements $[S_0]_1 \sim [S_{P-1}]_1$ of the first column from the circulant matrixes $S_0 \sim S_{P-1}$;
performing $[S_0]_1 \sim [S_{P-1}]_1$ with the discrete Fourier transform to obtain the diagonal matrix $\underline{D}_0 \sim \underline{D}_{P-1}$, wherein the $p^{th}$ diagonal matrix is represented as $\underline{D}_p = \text{diag}\{\underline{F} \cdot [\underline{S}_p]_1\}$;
composing the matrix $\underline{D}$ according to the diagonal matrix $\underline{D}_0 \sim \underline{D}_{P-1}$;
respectively generating F particular matrixes $\Lambda_1 \sim \Lambda_F$ according to the matrix D and calculating the inverse matrixes $(\Lambda_1)^{-1} \sim (\Lambda_F)^{-1}$ from the particular matrixes, wherein the $k^{th}$ particular matrix is represented as $$\Lambda_k = \begin{pmatrix} \underline{D}_0[k] & \underline{D}_1[k]^* & \cdots & \underline{D}_{P-1}[k]^* \\ \underline{D}_1[k] & \underline{D}_0[k] & \ddots & \underline{D}_{P-2}[k]^* \\ \vdots & \ddots & \ddots & \vdots \\ \underline{D}_{P-1}[k] & \underline{D}_{P-2}[k] & \cdots & \underline{D}_0[k] \end{pmatrix},$$

wherein $\underline{D}_p[k]$ represents the $k^{th}$ element of the diagonal matrix $\underline{D}_p$, where $k = 1, 2, \ldots, F$;

performing de-correlation operation for F times, wherein $i^{th}$ de-correlation operation receives the $i^{th}$ frequency component of the discrete Fourier transform result $F \cdot \underline{h}_p$ and correspondingly multiplies P frequency components to the elements of the $P^{th}$ row from the matrix $(\Lambda_i)^{-1}$ to output P pieces of sum of product, wherein $i = 1, 2, \ldots, F$; and
performing inverse Fourier transform for P times, wherein the $j^{th}$ inverse Fourier transform receives the $j^{th}$ sum of product, and performs the inverse Fourier transform to received F pieces of sum of product to output weight $\underline{w}_j$, wherein $j = 1, 2, \ldots, P$.

* * * * *